(12) United States Patent
Yin et al.

(10) Patent No.: US 12,520,319 B2
(45) Date of Patent: Jan. 6, 2026

(54) JOINT CODING AND MULTIPLEXING OF HARQ-ACK WITH DIFFERENT PRIORITIES ON PUCCH FORMAT 2, PUCCH FORMAT 3 OR PUCCH FORMAT 4

(71) Applicant: SHARP KABUSHIKI KAISHA, Sakai (JP)

(72) Inventors: Zhanping Yin, Vancouver, WA (US); Kai Ying, Vancouver, WA (US); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 393 days.

(21) Appl. No.: 18/027,366

(22) PCT Filed: Sep. 22, 2021

(86) PCT No.: PCT/JP2021/034694
§ 371 (c)(1),
(2) Date: Mar. 20, 2023

(87) PCT Pub. No.: WO2022/065334
PCT Pub. Date: Mar. 31, 2022

(65) Prior Publication Data
US 2023/0379916 A1 Nov. 23, 2023

Related U.S. Application Data

(60) Provisional application No. 63/082,932, filed on Sep. 24, 2020.

(51) Int. Cl.
*H04W 72/21* (2023.01)
*H04L 1/1812* (2023.01)
*H04W 72/566* (2023.01)

(52) U.S. Cl.
CPC .......... *H04W 72/21* (2023.01); *H04L 1/1812* (2013.01); *H04W 72/566* (2023.01)

(58) Field of Classification Search
CPC .. H04W 72/21; H04W 72/566; H04L 1/1812; H04L 1/1854
See application file for complete search history.

(56) References Cited

U.S. PATENT DOCUMENTS

2011/0249578 A1* 10/2011 Nayeb Nazar ........ H04L 5/0053
370/252
2019/0246416 A1 8/2019 Park et al.
(Continued)

FOREIGN PATENT DOCUMENTS

WO 2019/130522 A1 7/2019

OTHER PUBLICATIONS

3GPP TS 38.211 V16.2.0 (Jun. 2020) 3rd Generation Partnership Project; Technical Specification Group Radio Access Network; NR; Physical channels and modulation (Release 16).
(Continued)

*Primary Examiner* — Christine Ng
(74) *Attorney, Agent, or Firm* — ScienBiziP, P.C.

(57) ABSTRACT

A user equipment (UE) is described. The UE determines a joint coding for more than two bits of total payload for low priority hybrid automatic repeat request-acknowledgement (HARQ-ACK) and high priority HARQ-ACK on a physical uplink control channel (PUCCH). The UE also determines a PUCCH resource based on the total HARQ-ACK payload from sets of high priority PUCCH resources. The UE further determines a number of physical resource blocks (PRBs) for a PUCCH transmission based on the total HARQ-ACK payload and a maxCodeRate on the selected PUCCH resource. The UE also multiplexes the low priority HARQ-ACK and the high priority HARQ-ACK based on the
(Continued)

determined joint coding. The UE further transmits the multiplexed HARQ-ACK on the PUCCH.

7 Claims, 10 Drawing Sheets

(56) References Cited

U.S. PATENT DOCUMENTS

| | | | | |
|---|---|---|---|---|
| 2020/0235865 | A1* | 7/2020 | Takeda | H04L 1/1664 |
| 2021/0227503 | A1* | 7/2021 | Yoshioka | H04L 1/1854 |
| 2021/0250134 | A1* | 8/2021 | Islam | H04B 7/0626 |
| 2021/0258981 | A1* | 8/2021 | Hosseini | H04W 72/566 |
| 2021/0377991 | A1 | 12/2021 | Takeda et al. | |
| 2022/0086849 | A1* | 3/2022 | Lee | H04W 72/56 |
| 2022/0095337 | A1* | 3/2022 | Wang | H04L 5/0053 |
| 2022/0353884 | A1* | 11/2022 | Gao | H04L 5/0055 |
| 2022/0399978 | A1* | 12/2022 | Gao | H04L 5/0055 |
| 2023/0299928 | A1* | 9/2023 | Ling | H04L 1/1854 |
| | | | | 370/329 |
| 2023/0362922 | A1* | 11/2023 | Yuan | H04B 7/0413 |

OTHER PUBLICATIONS

Qualcomm Incorporated, "Intra-UE multiplexing and prioritization for IOT and URLLC", R1-2006802, 3GPP TSG RAN WG1 #102-e, e-Meeting, Aug. 17-28, 2020.

OPPO, "Summary of email discussion [97-NR-05] on handling intra-UE collision scenarios for URLLC UCI enhancements", R1-1909492, 3GPP TSG RAN WG1 #98 Prague, Czech, Aug. 26-30, 2019.

* cited by examiner

JOINT CODING AND MULTIPLEXING OF HARQ-ACK WITH DIFFERENT PRIORITIES ON PUCCH FORMAT 2, PUCCH FORMAT 3 OR PUCCH FORMAT 4

CROSS REFERENCE

This Nonprovisional application claims priority under 35 U.S.C. § 119 on provisional Application No. 63/082,932 on Sep. 24, 2020, the entire contents of which are hereby incorporated by reference.

TECHNICAL FIELD

The present disclosure relates generally to communication systems. More specifically, the present disclosure relates to joint coding and multiplexing of HARQ-ACK with different priorities on PUCCH format 2, PUCCH format 3 OR PUCCH format 4.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to: determine that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determine a PUCCH resource from the sets of PUCCH resources configured for priority index 1 based on the total HARQ-ACK payload of the first HARQ-ACK with priority index 1 and the second HARQ-ACK with priority index 0; and multiplex the HARQ-ACK with priority index 1 and the HARQ-ACK with priority index 0 on the selected PUCCH resource with priority index 1; and transmitting circuitry configured to transmit the multiplexed HARQ-ACK on the selected PUCCH with priority index 1.

In one example, a base station (gNB), comprising: a processor configured to: determine that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determine a PUCCH resource from the sets of PUCCH resources configured for priority index 1 based on the total HARQ-ACK payload of the first HARQ-ACK with priority index 1 and the second HARQ-ACK with priority index 0; and receiving circuitry configured to receive the multiplexed HARQ-ACK with priority index 1 and HARQ-ACK with priority index 0 on the selected PUCCH resource with priority index 1.

In one example, a method by a user equipment (UE), comprising: determining that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determining a PUCCH resource from the sets of PUCCH resources configured for priority index 1 based on the total HARQ-ACK payload of the first HARQ-ACK with priority index 1 and the second HARQ-ACK with priority index 0; and multiplexing the HARQ-ACK with priority index 1 and the HARQ-ACK with priority index 0 on the selected PUCCH resource with priority index 1; and transmitting the multiplexed HARQ-ACK on the selected PUCCH with priority index 1.

In one example, a method by a base station (gNB), comprising: a processor configured to: determining that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determining a PUCCH resource from the sets of PUCCH resources configured for priority index 1 based on the total HARQ-ACK payload of the first HARQ-ACK with priority index 1 and the second HARQ-ACK with priority index 0; and receiving the multiplexed HARQ-ACK with priority index 1 and HARQ-ACK with priority index 0 on the selected PUCCH resource with priority index 1.

DESCRIPTION OF EMBODIMENTS

Figure 1:
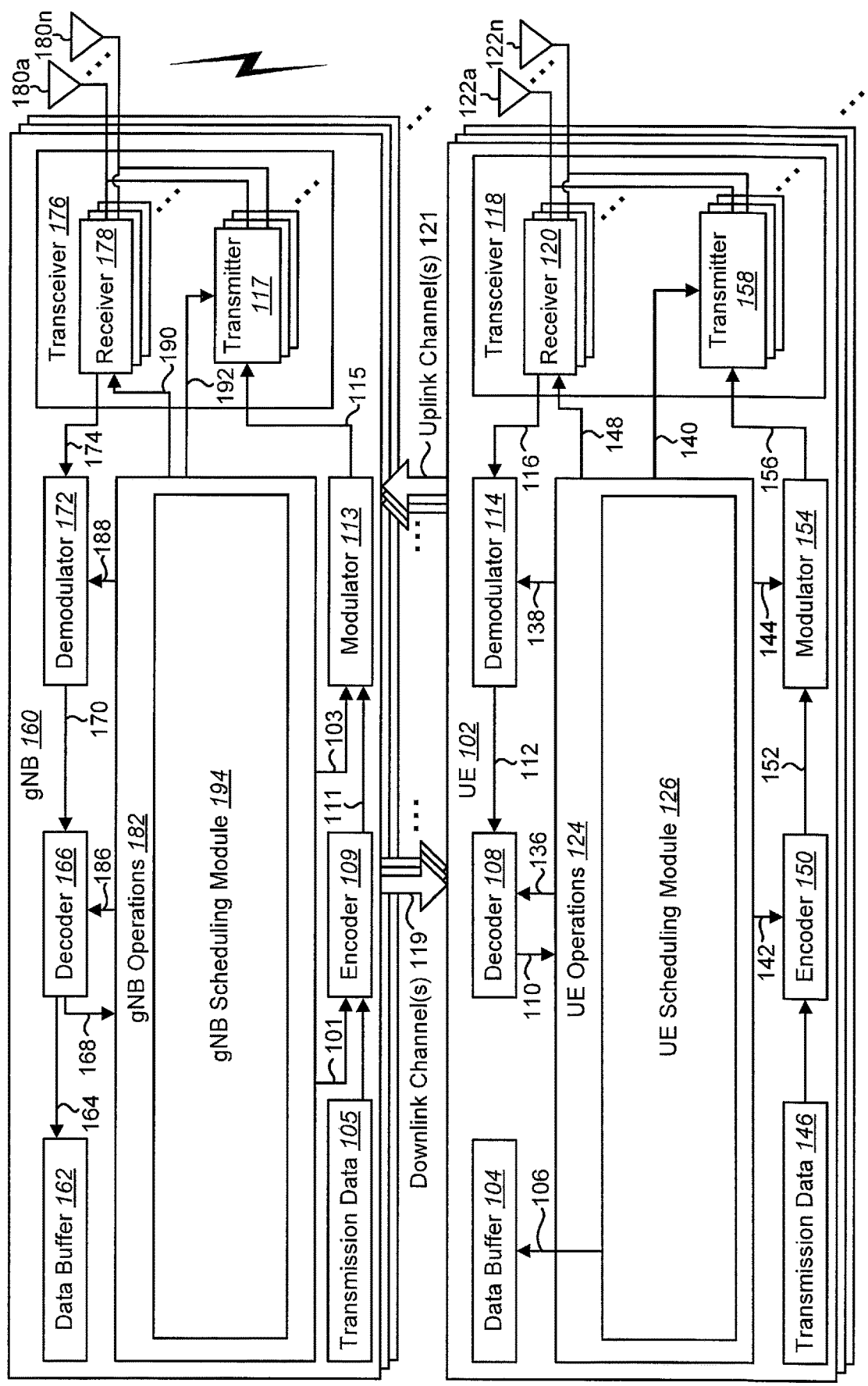
FIG. 1 is a block diagram illustrating one implementation of one or more gNBs and one or more UEs in which systems and methods for multiplexing of HARQ-ACK with different priorities on PUCCH may be implemented.

A user equipment (UE) is described. The UE includes a processor configured to determine a joint coding for up to two bits of low priority hybrid automatic repeat request-acknowledgement (HARQ-ACK) and high priority HARQ-ACK on a physical uplink control channel (PUCCH). The processor is also configured to multiplex the low priority HARQ-ACK and the high priority HARQ-ACK based on the determined joint coding. The UE also includes transmitting circuitry configured to transmit the multiplexed HARQ-ACK on the PUCCH.

In one approach, determining the joint coding may include using a same PUCCH resource with PUCCH format 0 or PUCCH format 1 for the high priority HARQ-ACK. In another approach, determining the joint coding may include choosing PUCCH resource based on a total payload, where a PUCCH format 2/3/4 is used if a total payload is greater than 2. In another approach, determining the joint coding may include using a PUCCH format 2/3/4 with more than 2 bits of uplink control information (UCI) payload. In yet another approach, determining the joint coding may include determining the joint coding based on a PUCCH channel selection.

A base station (gNB) is also described. The gNB includes a processor configured to determine a joint coding for up to two bits of low priority HARQ-ACK and high priority HARQ-ACK on a PUCCH. The gNB also includes receiving circuitry configured to receive multiplexed HARQ-ACK on the PUCCH, the low priority HARQ-ACK and the high priority HARQ-ACK being multiplexed based on the determined joint coding.

A method by a UE is also described. The method includes determining a joint coding for up to two bits of low priority HARQ-ACK and high priority HARQ-ACK on a PUCCH. The method also includes multiplexing the low priority HARQ-ACK and the high priority HARQ-ACK based on the determined joint coding. The method further includes transmitting the multiplexed HARQ-ACK on the PUCCH.

A method by a gNB is also described. The method includes determining a joint coding for up to two bits of low priority HARQ-ACK and high priority HARQ-ACK on a PUCCH. The method also includes receiving multiplexed HARQ-ACK on the PUCCH, the low priority HARQ-ACK and the high priority HARQ-ACK being multiplexed based on the determined joint coding.

Another user equipment (UE) is described. The UE determines a joint coding for more than two bits of total payload for low priority hybrid automatic repeat request-acknowledgement (HARQ-ACK) and high priority HARQ-ACK on a physical uplink control channel (PUCCH). The UE also determines a PUCCH resource based on the total HARQ-ACK payload from sets of high priority PUCCH resources. The UE further determines a number of physical resource blocks (PRBs) for a PUCCH transmission based on the total HARQ-ACK payload and a maxCodeRate on the selected PUCCH resource. The UE also multiplexes the low priority HARQ-ACK and the high priority HARQ-ACK based on the determined joint coding. The UE further transmits the multiplexed HARQ-ACK on the PUCCH.

The high priority HARQ-ACK and low priority HARQ-ACK may be concatenated into a single joint HARQ-ACK codebook for the PUCCH transmission.

If the total HARQ-ACK payload exceeds a maximum payload size of all configured sets of high priority HARQ-ACK PUCCH resources, then the UE may transmit the high priority HARQ-ACK on a high priority PUCCH based on a payload of the high priority HARQ-ACK and may drop a low priority HARQ-ACK codebook.

Alternatively, if the total HARQ-ACK payload exceeds a maximum payload size of all configured sets of high priority HARQ-ACK PUCCH resources, then the UE may perform payload reduction to a low priority HARQ-ACK codebook. The UE may also create a new joint HARQ-ACK codebook by appending the payload reduced low priority HARQ-ACK to a high priority HARQ-ACK codebook.

Another base station (gNB) is also described. The gNB determines a joint coding for more than two bits of total payload for low priority HARQ-ACK and high priority HARQ-ACK on a PUCCH. The gNB also determines a PUCCH resource based on the total HARQ-ACK payload from sets of high priority PUCCH resources. The gNB further determines a number of PRBs for a PUCCH transmission based on the total HARQ-ACK payload and a maxCodeRate on the selected PUCCH resource. The gNB additionally receives multiplexed HARQ-ACK on the PUCCH, the low priority HARQ-ACK and the high priority HARQ-ACK being multiplexed based on the determined joint coding.

Another method by a UE is also described. The method includes determining a joint coding for more than two bits of total payload for low priority HARQ-ACK and high priority HARQ-ACK on a PUCCH. The method also includes determining a PUCCH resource based on the total HARQ-ACK payload from sets of high priority PUCCH resources. The method further includes determining a number of PRBs for a PUCCH transmission based on the total HARQ-ACK payload and a maxCodeRate on the selected PUCCH resource. The method additionally includes multiplexing the low priority HARQ-ACK and the high priority HARQ-ACK based on the determined joint coding. The method also includes transmitting the multiplexed HARQ-ACK on the PUCCH.

Another method by a gNB is also described. The method includes determining a joint coding for more than two bits of total payload for low priority (HARQ-ACK and high priority HARQ-ACK on a PUCCH. The method also includes determining a PUCCH resource based on the total HARQ-ACK payload from sets of high priority PUCCH resources. The method further includes determining a number of PRBs for a PUCCH transmission based on the total HARQ-ACK payload and a maxCodeRate on the selected PUCCH resource. The method additionally includes receiving multiplexed HARQ-ACK on the PUCCH, the low priority HARQ-ACK and the high priority HARQ-ACK being multiplexed based on the determined joint coding.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In de-scribing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In NR release-17, HARQ-ACK multiplexing with different priorities on PUCCH will be supported. Both joint coding and separate coding methods are considered. In this disclosure, the details of joint coding methods for multiplexing of HARQ-ACK with different priorities are discussed. For example, when the payload size is small, joint coding may be performed.

In a first aspect, methods are described for HARQ-ACK multiplexing when the number of HARQ-ACK is no more than 2 bits for both high priority HARQ-ACK and low priority HARQ-ACK. In this case, it may be desirable to keep sequence based PUCCH format 0 or PUCCH format 1 for its reliability and resource efficiency.

In a second aspect, joint coding methods are described when the high priority HARQ-ACK and low priority HARQ-ACK are concatenated into a single joint HARQ-ACK coding book for PUCCH transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for multiplexing of HARQ-ACK with different priorities on PUCCH may be implemented. The one or more UEs 102 communicate with one or more gNBs 160 using one or more antennas 122$a$-$n$. For example, a UE 102 transmits electromagnetic signals to the gNB 160 and receives electromagnetic signals from the gNB 160 using the one or more antennas 122$a$-$n$. The gNB 160 communicates with the UE 102 using one or more antennas 180$a$-$n$.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform multiplexing of HARQ-ACK with different priorities on PUCCH as described herein.

Details of joint coding methods for multiplexing of HARQ-ACK with different priorities on a single PUCCH are discussed herein. In an aspect, support of multiplexing of HARQ-ACK with different priorities is described. A PUSCH or a PUCCH, including repetitions if any, can be of priority index 0 or of priority index 1. If a priority index is not provided for a PUSCH or a PUCCH, the priority index is 0.

A high priority UCI may be a high priority HARQ-ACK or a high priority SR. The priority of a SR can be indicated in a SR configuration by higher layer signaling. A high priority HARQ-ACK corresponds to a high priority PDSCH transmission. The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, HARQ-ACK or PUCCH resource may be configured to support URLLC services. The high priority is configured with a priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, HARQ-ACK or PUCCH resource may be configured to support eMBB services. The low priority is configured with a priority index 0.

In NR release-16, UCI multiplexing on PUCCH is supported only for UCIs with the same priority. As enhancements of HARQ-ACK reporting with different priorities, multiplexing of UCI between different priorities can be supported by high layer signaling under some timing restrictions. For example, multiplexing of the same UCI type on a single PUCCH may be supported (e.g., URLLC HARQ-ACK and eMBB HARQ-ACK). In an example, if the low priority PUCCH carrying low priority HARQ-ACK can be fully dropped by the high priority PUCCH carrying high priority HARQ-ACK, multiplexing of HARQ-ACK with different priorities on a single PUCCH is supported. Otherwise, the low priority PUCCH carrying low priority HARQ-ACK is dropped and the high priority PUCCH carrying high priority HARQ-ACK is transmitted.

In another aspect, joint coding for multiplexing of HARQ-ACK with different priorities is described herein. If multiplexing of HARQ-ACK with different priorities on a PUCCH is supported, joint coding may be supported. With joint coding, the HARQ-ACK bits of different priorities are concatenated into a single codebook, and the joint codebook is encoded and rate matched based on the maximum coding rate of the URLLC PUCCH configuration, and then transmitted on a selected URLLC PUCCH resource.

The PUCCH resource for HARQ-ACK multiplexing of different priorities may be a PUCCH resource configured for the high priority HARQ-ACK codebook (e.g., HARQ-ACK codebook with priority index 1). A UE may be configured by max-CodeRate a code rate multiplexing HARQ-ACK of different priorities in a PUCCH transmission using PUCCH format 2, PUCCH format 3, or PUCCH format 4 configured for high priority HARQ-ACK codebook.

Joint coding applies only one channel coding process and may be simpler to implement. This is a priority inheritance mechanism. When low priority UCI is multiplexed with high priority UCI, the channel coding and error protection for the low priority UCI is promoted, evaluated and/or inherited from the high priority UCI. For UCI multiplexing between different priorities, the low priority UCI is provided with the same reliability and error protection as the high priority UCI. On the other hand, the PUCCH resource utilization is low because all bits are coded together, and the coded bits are rate matched with ultra-reliability requirements following the maximum coding rate configured for the high priority PUCCH.

Joint coding may provide some benefits. For example, joint coding may provide validation by CRC for a codebook with up to 11 bits when the total payload is greater than 11 bits. Joint coding may reduce overhead with one CRC instead of two CRCs. Joint coding may provide higher coding gain (e.g., larger payload by polar code vs. smaller payload by RM code).

For a HARQ-ACK reporting, the PUCCH may be selected based on a maximum payload size configured for a set of PUCCH resources. A UE can be configured with up to 4 sets of PUCCH resources with different maximum payload sizes. Within each set, the maximum coding rate should satisfy the maximum payload configured for the given set of PUCCH resources. Also, the actual PUCCH transmission does not need to use all configured number of Physical Resource Blocks (PRBs). The PUCCH transmission may use the minimum number of PRBs that can satisfy the maximum code rate for the reported UCI payload.

With joint coding of HARQ-ACK with different priorities, the selected PUCCH format and resource may be determined based on the total payload size of high priority HARQ-ACK and low priority HARQ-ACK. The detailed HARQ-ACK multiplexing method should be specified based on different payload ranges. For example, HARQ-ACK multiplexing method may be specified when both high priority HARQ-ACK and low priority HARQ-ACK are less than or equal to 2 bits.

Multiplexing of HARQ-ACK with different priorities on PUCCH for up to 2 bits HARQ-ACK codebooks is now described. For up to 2 bits of UCI reporting on PUCCH, a sequence based PUCCH format 0 or PUCCH format 1 is used. Compared with other PUCCH formats with larger payload size, sequence based PUCCH format 0/1 is more reliable with less resource utilization. Therefore, it is desirable to use PUCCH format 0 or PUCCH format 1 when possible, especially when the HARQ-ACK bits of each priority index is no more than 2 bits.

In NR, the number of codewords per PDSCH assignment per UE is limited to one codeword for 1 to 4-layer transmission, and 2 codewords for 5 to 8-layer transmission. In the case of one codeword in a PDSCH, one TB level HARQ-ACK bit is generated corresponding to the PDSCH. In the case of 2 codewords in a PDSCH, 2 TB level HARQ-ACK bits are generated for the PDSCH. Therefore, for eMBB service, a PDSCH with 2 codeword is more likely. For URLLC, due to ultra-reliability requirements, one codeword is more practical.

Several methods can be considered for reporting of up to 2 bits of HARQ-ACK for both high priority and low priority.

In a first method (Method 1), PUCCH format 0 and 1 may always be used on the high priority HARQ-ACK PUCCH resource. In this method, PUCCH format 0/1 may always be used for HARQ-ACK multiplexing with different priorities if both high priority HARQ-ACK and low priority HARQ-ACK are up to 2 bits. The original high priority HARQ-ACK PUCCH resource may be used for the joint HARQ-ACK reporting.

In a first approach (Approach 1) of Method 1, HARQ-ACK multiplexing with bundling may be applied within the same priority. In this approach, HARQ-ACK bundling may be applied in case of 2 bits of HARQ-ACK in a codebook so that the total number of HARQ-ACK bits is kept as 2 bits.

For multiplexing of 1 bit of high priority HARQ-ACK and 1 bit of low priority HARQ-ACK, the low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 1 bit of high priority HARQ-ACK and 2 bits of low priority HARQ-ACK, the 2 bits of low priority HARQ-ACK can be bundled into 1 bit first by an AND function. Thus, the bits 00, 01, and 10 may be bundled as 0, and bits 11 will be bundled as 1. The bundled low priority HARQ-ACK bit may then be appended to the high priority HARQ-ACK. The joint HARQ-ACK has 2 bits and may be reported on a high priority PUCCH resource with PUCCH format 0 or format 1.

For multiplexing of 2 bits of high priority HARQ-ACK and 1 bit of low priority HARQ-ACK, the 2 bits of high priority HARQ-ACK can be bundled into 1 bit first by an AND function. The low priority HARQ-ACK bit may then be appended to the bundled high priority HARQ-ACK. The joint HARQ-ACK has 2 bits and may be reported on a high priority PUCCH resource with PUCCH format 0 or format 1.

For multiplexing of 2 bits of high priority HARQ-ACK and 2 bits of low priority HARQ-ACK, the 2 bits of high priority HARQ-ACK can be bundled into 1 bit by an AND function. And the 2 bits of low priority HARQ-ACK may be bundled into 1 bit by an AND function. The bundled low priority HARQ-ACK bit may then be appended to the bundled high priority HARQ-ACK. The joint HARQ-ACK has 2 bits and may be reported on a high priority PUCCH resource with PUCCH format 0 or format 1.

The joint HARQ-ACK may be reported on a high priority PUCCH resource, so the HARQ-ACK report reliability is not an issue. The issue with HARQ-ACK bundling is the loss of information.

For low priority HARQ-ACK for eMBB PDSCH transmissions, the initial transmission NACK probability is around 10%. In the case of two TBs in a PDSCH, HARQ-ACK bits of "01", "10" and "00" may all be reported as NACK. Thus, the NACK probability after bundling becomes approximately 20%, which may cause more unnecessary TB retransmissions. However, compared with URLLC PDSCH, eMBB PDSCH is more spectrum efficient with higher FER target and HARQ with soft combining of re-transmissions.

For high priority HARQ-ACK for URLLC PDSCH transmissions, the initial transmission NACK probability may be targeted at 10^-5 or 10^-6, which is much lower than that of an eMBB PDSCH. Thus, the PDSCH for URLLC may use conservative MCS and much lower coding rate to achieve this target. In the case of two TBs in a high priority PDSCH, HARQ-ACK bits of "01", "10" and "00" may all be reported as NACK. Thus, the NACK probability after bundling becomes 2 times of the target rate at $10^{-5}$ or $10^{-6}$, which is still very low. Thus, the impact of HARQ-ACK bundling of the high priority HARQ-ACK is much smaller than the impact of bundling of low priority HARQ-ACK. Furthermore, since 2 codewords are supported only for 5-8 layers of MIMO transmissions, due to ultra-reliability requirements, one codeword is more likely for URLLC PDSCH transmissions.

In a second approach (Approach 2) of Method 1, HARQ-ACK multiplexing with bundling may be applied across different priorities (referred to herein as cross priority HARQ-ACK bundling). The above Approach 1 limits HARQ-ACK bundling within the same priority. Alternatively, HARQ-ACK bundling may be performed between HARQ-ACK bits of high priority and low priority. For example, considering the URLLC NACK probability is ultra-low, the ACK reported in the majority of cases may be 99.9999%. A bundle between a high priority HARQ-ACK bit and a low priority HARQ-ACK bit may result in the same value as the low priority HARQ-ACK bit. With this assumption, the alternative approaches can be considered as follows.

For multiplexing of 1 bit of high priority HARQ-ACK and 1 bit of low priority HARQ-ACK, the low priority HARQ-ACK can be appended to the high priority HARQ-ACK to generate a joint 2 bits HARQ-ACK.

For multiplexing of 1 bit of high priority HARQ-ACK and 2 bits of low priority HARQ-ACK, the 1 bit high priority HARQ-ACK may be bundled into the first bit of low priority HARQ-ACK. The second bit of low priority HARQ-ACK may then be appended. Alternatively, the 1 bit high priority HARQ-ACK may be bundled into the second bit of low priority HARQ-ACK. The bundled bit may then be appended to the first bit of low priority HARQ-ACK.

For multiplexing of 2 bits of high priority HARQ-ACK and 1 bit of low priority HARQ-ACK, the 1 bit low priority HARQ-ACK may be bundled into the first bit of high priority HARQ-ACK. The second bit of high priority HARQ-ACK may then be appended. Alternatively, the 1 bit low priority HARQ-ACK may be bundled into the second bit of low priority HARQ-ACK. The bundled bit may then be appended to the first bit of high priority HARQ-ACK.

For multiplexing of 2 bits of high priority HARQ-ACK and 2 bits of low priority HARQ-ACK, the first bit of high priority HARQ-ACK and the first bit of low priority HARQ-ACK may be bundled into a bundled first bit. The second bit of high priority HARQ-ACK and the second bit of low priority HARQ-ACK may be bundled into a second bundled bit. The first bundle bit and the second bundled bit may be concatenated into 2 bits.

In all cases, the resulting 2 bits of HARQ-ACK may be reported on the high priority HARQ-ACK PUCCH resource with PUCCH format 0 or PUCCH format 1. With cross priority HARQ-ACK bundling, the drawback is that a NACK from a low priority HARQ-ACK bit will cause a NACK report for the high priority HARQ-ACK bit.

In a third approach (Approach 3) of Method 1, HARQ-ACK bundling is allowed between different priorities with high priority NACK overwriting. In this approach, HARQ-ACK bundling may be applied between high priority and low priority HARQ-ACK bits if there are 2 bits of HARQ-ACK in a codebook. But the total number of HARQ-ACK bits after bundling is kept as 2 bits.

In some cases, bundling between HARQ-ACK with different priorities may not be a good idea due to very different target error rate for PDSCH transmissions. If a high priority HARQ-ACK and a low priority HARQ-ACK are bundled together, the bundled bit will have roughly 10% NACK probability. Although ACK to NACK error does not lose data, is may still be too high for URLLC services.

However, since URLLC NACK probability is ultra-low, ACK reported in the majority of cases may be 99.9999%. Therefore, in case of 2 bits of low priority HARQ-ACK bits, the low priority HARQ-ACK bits can be reported on the high priority PUCCH resource assuming an ACK is reported for URLLC. In the case that at least a NACK is reported for high priority HARQ-ACK, the UE should report all NACKs (e.g., "00" on the high priority PUCCH resource). Thus, a NACK of the high priority HARQ-ACK may overwrite the low priority HARQ-ACK.

For multiplexing of 1 bit of high priority HARQ-ACK and 1 bit of low priority HARQ-ACK, this may be the same as Approach 1. The low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 2 bits of high priority HARQ-ACK and 1 bit of low priority HARQ-ACK, this may be the same as Approach 1. The 2 bits of high priority HARQ-ACK can be bundled into 1 bit first by an AND function. The low priority HARQ-ACK bit may then be appended to the bundled high priority HARQ-ACK. The joint HARQ-ACK has 2 bits and may be reported on a high priority PUCCH resource with PUCCH format 0 or format 1.

If the new approach is applied for multiplexing of 2 bits of high priority HARQ-ACK and 1 bit of low priority HARQ-ACK, then if the high priority HARQ-ACK is all ACKs (e.g., "11" for the two HARQ-ACK bits), then 1 bit of low priority HARQ-ACK may be reported on the high priority PUCCH resource.

If the high priority HARQ-ACK has at least a NACK (e.g., "01", "10" or "11" for the two HARQ-ACK bits), then the UE may report all NACKs (e.g., "00") on the high priority PUCCH resource. The 1 bit of low priority HARQ-ACK may be overwritten by the high priority NACK. With this approach, an all-NACK (e.g., "00") report may indicate a NACK for high priority HARQ-ACK or a NACK for the low priority HARQ-ACK even if there are all ACKs for the high priority HARQ-ACK. The high priority ACK to NACK error report probability is approximately 10% with 1 bit of low priority HARQ-ACK. This may be too high for the high priority HARQ-ACK.

For multiplexing of 1 bit of high priority HARQ-ACK and 2 bits of low priority HARQ-ACK, if the high priority HARQ-ACK is an ACK, the 2 bits of low priority HARQ-ACK may be reported on the high priority PUCCH resource. If the high priority HARQ-ACK is a NACK, then the UE may report all NACKs (e.g., "00") on the high priority PUCCH resource. The 2 bits of low priority HARQ-ACK may be overwritten by the high priority NACK.

For multiplexing of 2 bits of high priority HARQ-ACK and 2 bits of low priority HARQ-ACK, if the high priority HARQ-ACK is all ACKs (e.g., "11") for the two HARQ-ACK bits, the 2 bits of low priority HARQ-ACK are reported on the high priority PUCCH resource. If the high priority HARQ-ACK has at least a NACK (e.g., "01", "10" or "11") for the two HARQ-ACK bits, then the UE should report all NACKs (e.g., "00") on the high priority PUCCH resource. The 2 bits of low priority HARQ-ACK may be overwritten by the high priority NACK.

Thus, an all-NACK (e.g., "00") report may indicate a NACK for high priority HARQ-ACK or all NACKs for the low priority HARQ-ACK even if all ACKs for the high priority HARQ-ACK. The high priority ACK to NACK error report probability is approximately 1% when 2 bits of eMBB are all NACK each with a 10% NACK probability. The miss-reporting of low priority ACK to NACK error is almost avoided for 01 and 10 cases, and the probability of low priority "11" to "00" by URLLC NACK Is negligible at the order of 10^−5. This approach ensures no information loss for the low priority HARQ-ACK with minimized impact on the low priority HARQ-ACK.

In a fourth approach (Approach 4) of Method 1, for PUCCH format 0, HARQ-ACK bundling is applied for low priority HARQ-ACK, and cyclic shift values are used to represent low priority HARQ-ACK. The HARQ-ACK bundling reduces the HARQ-ACK granularity. This may not be desirable at least for high priority HARQ-ACK bits. Thus, in another approach, if the PUCCH format 0 is used to carry the high priority HARQ-ACK bits, bundling of high priority HARQ-ACK bits is not used. The high priority HARQ-ACK is reported on the original PUCCH resource, the low priority HARQ-ACK is represented by applying the same cyclic shift or a different cyclic shift on the sequence and cyclic shift determined by the high priority HARQ-ACK information bits.

With this approach, only 1 bit of low priority HARQ-ACK bit is reported. In the case of 2 bits of low priority HARQ-ACK, the low priority HARQ-ACK may be bundled to 1 bit by an AND function. Thus, the low priority HARQ-ACK bits of 00, 01, and 10 will be bundled as 0, and bits 11 will be bundled as 1.

In the case of multiplexing of up to 2 bits of HARQ-ACK with priority index 1 and up to 2 bits of HARQ-ACK with priority index 0 on a PUCCH format 0 configured for the HARQ-ACK with priority index 1, the high priority HARQ-ACK bits may be represented by a cyclic shift on the sequence based on the UCI bits, and the low priority HARQ-ACK bits may be represented by applying the same or a different cyclic shift over the high priority HARQ-ACK bits. The additional cyclic shift value may be determined by the low priority HARQ-ACK value.

In one method, in the case of one bit of low priority HARQ-ACK bit with an ACK or "1", or two bits of low priority HARQ-ACK bit with an all ACKs or "11", the cyclic shift of the high priority HARQ-ACK bits may be kept the same. In the case of one bit of low priority HARQ-ACK bit with a NACK or "0", or two bits of low priority HARQ-ACK bit with at least a NACK, i.e. "01", "10" or "00", a different cyclic shift from the high priority HARQ-ACK bits may be used. The cyclic shifts for different HARQ-ACK bits combinations are given in tables below. Table-1 illustrates an example for mapping of values for one high priority HARQ-ACK information bit and one or two low priority HARQ-ACK information bits to sequences for PUCCH format 0. Table-2 illustrates an example for mapping of values for two high priority HARQ-ACK information bits and one or two low priority HARQ-ACK information bits to sequences for PUCCH format 0.

TABLE 1

| | High priority HARQ-ACK value | | | |
|---|---|---|---|---|
| | 0 | | 1 | |
| Low priority HARQ-ACK value | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits |
| Sequence cyclic shift | $m_{cs} = 0$ | $m_{cs} = 3$ | $m_{cs} = 6$ | $m_{cs} = 9$ |

TABLE 2

| | High priority HARQ-ACK value | | | | | | | |
|---|---|---|---|---|---|---|---|---|
| | {0, 0} | | {0, 1} | | {1, 1} | | {1, 0} | |
| Low priority HARQ-ACK value | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits |
| Sequence cyclic shift | $m_{CS} = 0$ | $m_{CS} = 1$ | $m_{CS} = 3$ | $m_{CS} = 4$ | $m_{CS} = 6$ | $m_{CS} = 7$ | $m_{CS} = 9$ | $m_{CS} = 10$ |

If a UE transmits a PUCCH with HARQ-ACK information using PUCCH format 0, the UE may determine values $m_o$ and $m_{cs}$ for computing a value of cyclic shift a where $m_o$ is provided by initialCyclicShift of PUCCH-format0 or, if initialCyclicShift is not provided, by the initial cyclic shift index, and $m_{cs}$ is determined from the value of one HARQ-ACK information bit or from the values of two HARQ-ACK information bits.

In another implementation, the opposite may apply. Thus, in the case of one bit of low priority HARQ-ACK bit with an NACK or "0", or two bits of low priority HARQ-ACK bit with at least a NACK (e.g., "01", "10" or "00"), the cyclic shift of the high priority HARQ-ACK bits is kept the same. In the case of one bit of low priority HARQ-ACK bit with an ACK or "1", or two bits of low priority HARQ-ACK bit with an all ACKs or "11", a different cyclic shift from the high priority HARQ-ACK bits may be used. The cyclic shifts for different HARQ-ACK bits combinations are given in the tables below. Table-3 illustrates an example for mapping of values for one high priority HARQ-ACK information bit and one or two low priority HARQ-ACK information bits to sequences for PUCCH format 0. Table-4 illustrates an example for mapping of values for two high priority HARQ-ACK information bits and one or two low priority HARQ-ACK information bit to sequences for PUCCH format 0.

TABLE 3

| | High priority HARQ-ACK | | | |
|---|---|---|---|---|
| | 0 | | 1 | |
| Low priority HARQ-ACK | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{cs} = 0$ | $m_{cs} = 3$ | $m_{cs} = 6$ | $m_{cs} = 9$ |

TABLE 4

| | High priority HARQ-ACK | | | | | | | |
|---|---|---|---|---|---|---|---|---|
| | {0, 0} | | {0, 1} | | {1, 1} | | {1, 0} | |
| Low priority HARQ-ACK | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{CS} = 0$ | $m_{CS} = 1$ | $m_{CS} = 3$ | $m_{CS} = 4$ | $m_{CS} = 6$ | $m_{CS} = 7$ | $m_{CS} = 9$ | $m_{CS} = 10$ |

In a second method (Method 2), different high priority PUCCH formats and resources may be used based on total HARQ-ACK payload. In this method, the number of high priority HARQ-ACK bits is not bundled, and one bit of HARQ-ACK can be multiplexed as it is. The total payload may have different variations based on the combinations of number of bits for the HARQ-ACK codebooks, and different PUCCH resources with different PUCCH formats may be used for the HARQ-ACK multiplexing.

For multiplexing of 1 bit of high priority HARQ-ACK and 1 bit of low priority HARQ-ACK, the low priority HARQ-ACK can be appended to the high priority HARQ-ACK. The joint HARQ-ACK has 2 bits and may be reported on a high priority PUCCH resource with PUCCH format 0 or PUCCH format 1.

For multiplexing of 1 bit of high priority HARQ-ACK and 2 bits of low priority HARQ-ACK, two approaches can be considered. In one approach, the 2 bits of low priority HARQ-ACK is bundled into 1 bit, the bundled low priority HARQ-ACK bit can be appended to the high priority HARQ-ACK. The joint HARQ-ACK has 2 bits and may be reported on a high priority PUCCH resource with PUCCH format 0 or PUCCH format 1. In another approach, the 2 bits of low priority HARQ-ACK can be appended to the high priority HARQ-ACK. The joint HARQ-ACK has more than 2 bits and may be reported on a high priority PUCCH resource with PUCCH format 2 or PUCCH format 3 or PUCCH format 4.

For multiplexing of 2 bits of high priority HARQ-ACK and 1 bit or 2 bits of low priority HARQ-ACK, the low priority HARQ-ACK can be appended to the high priority HARQ-ACK. The joint HARQ-ACK has more than 2 bits and may be reported on a high priority PUCCH resource with PUCCH format 2 or PUCCH format 3 or PUCCH format 4.

In a third method (Method 3), 2 bits for each HARQ-ACK priority may always be assumed and multiplexed on a high priority HARQ-ACK PUCCH resource with PUCCH format 2/3/4. In this method, the PUCCH resource carrying the multiplexed HARQ-ACK codebooks is always a high priority HARQ-ACK PUCCH resource used with PUCCH format 2 or PUCCH format 3 or PUCCH format 4 carrying more than 2 bits. Thus, in the case of 1 or 2 bits of HARQ-ACK, the UE may always assume 2 bits when HARQ-ACK multiplexing between different priorities is performed. In the case of 1 bit of HARQ-ACK in a codebook, the HARQ-ACK information bit may be repeated to generate two bits (e.g., a bit of "0" may be is reported with "00", and a bit of "1" may be reported with "11"). This ensures the total payload is more than 2 bits.

The concatenated HARQ-ACK bits are then encoded and transmitted on a high priority HARQ-ACK PUCCH resource with PUCCH format 2 or PUCCH format 3 or PUCCH format 4. This provides a unified solution for multiplexing of HARQ-ACK with different priorities regardless of the HARQ-ACK codebook sizes.

In a fourth method (Method 4), joint HARQ-ACK multiplexing and reporting may be performed with PUCCH channel selection. In the methods above, the PUCCH resource for high priority HARQ-ACK is used to report the multiplexed HARQ-ACK bits with different priorities with bundling as necessary. In another method, since there are PUCCH resources for both high priority and low priority HARQ-ACK, PUCCH channel selection can be used to carry extra information for HARQ-ACK multiplexing.

As discussed above, for high priority HARQ-ACK, the NACK probability even after HARQ-ACK bundling becomes 2 times the target rate at 10^-5 or 10^-6, which is still very low. Thus, the impact of HARQ-ACK bundling of the high priority HARQ-ACK is very small. URLLC NACK probability is ultra-low, and the ACK reported in the majority of cases may be 99.9999%.

To explore the ultra-reliability of URLLC traffic, in this method, in case of all ACKs for the high priority HARQ-ACK, high priority HARQ-ACK PUCCH resource is used to report 1 or 2 bits of low priority HARQ-ACK, i.e. one or two bits the eMBB HARQ-ACK bits are reported on the URLLC PUCCH resource. If there is at least a NACK for the high priority HARQ-ACK, the high priority HARQ-ACK PUCCH is not transmitted. The low priority HARQ-ACK is reported on the low priority HARQ-ACK PUCCH resource. Since the high priority PUCCH is not transmitted, the gNB cannot detect the high priority PUCCH transmission, and will treat it as a DTX, where a DTX is equivalent to NACK in HARQ-ACK reporting.

For multiplexing of 1 bit of high priority HARQ-ACK and 1 bit or 2 bits of low priority HARQ-ACK, with an ACK feedback of the high priority HARQ-ACK, the 1 bit or 2 bits of low priority HARQ-ACK may be reported on the high priority PUCCH resource. With a NACK feedback of the high priority HARQ-ACK, the 1 bit or 2 bits of low priority HARQ-ACK may be reported on the low priority PUCCH resource.

For multiplexing of 2 bits of high priority HARQ-ACK and 1 bit or 2 bits of low priority HARQ-ACK, with all ACK feedback of the high priority HARQ-ACK (e.g., "11" for high priority HARQ-ACK), the 1 bit or 2 bits of low priority HARQ-ACK may be reported on the high priority PUCCH resource. With at least a NACK feedback of the high priority HARQ-ACK (e.g., "01", "10" or "00" for high priority HARQ-ACK), the 1 bit or 2 bits of low priority HARQ-ACK may be reported on the low priority PUCCH resource.

With Method 4, almost no HARQ-ACK information is lost due to HARQ-ACK bundling. The high priority HARQ-ACK may be represented by the PUCCH resource selection. An ACK may be reported for the high priority HARQ-ACK if the low priority HARQ-ACK is reported on the high priority PUCCH resource. A NACK may be reported for the high priority HARQ-ACK if the low priority HARQ-ACK is reported on the low priority PUCCH resource.

In another aspect, joint coding and multiplexing of HARQ-ACK of different priorities on PUCCH format 2/3/4 are described. A joint coding method is described wherein the high priority HARQ-ACK and low priority HARQ-ACK are concatenated into a single joint HARQ-ACK coding book for PUCCH transmission. This is a more general case for HARQ-ACK multiplexing on PUCCH with joint coding.

Some examples of conditions for HARQ-ACK multiplexing using PUCCH format 2/3/4 are now described. PUCCH format 2, PUCCH format 3 and PUCCH format 4 are defined for more than 2 bits of UCI payload. $O_{ACK\_1}$ may be a total number of HARQ-ACK information bits with priority index 1. $O_{ACK\_0}$ may be a total number of HARQ-ACK information bits with priority index 0.

If there are up to 2 bits of for both high priority HARQ-ACK and low priority HARQ in a HARQ-ACK only reporting, and if method 1 or method 4 above are used, PUCCH format 0 or PUCCH format 1 may always be used for the joint HARQ-ACK multiplexing and reporting. Thus, even if the total payload of high priority HARQ-ACK and low priority HARQ-ACK is more than 2 bits, a joint report method on PUCCH format 2 or PUCCH format 3 or PUCCH format 4 is not applicable.

Therefore, in one approach, if method 1 and method 4 above are used for up to 2 bits of HARQ-ACK codebooks, multiplexing of HARQ-ACK of different priorities with joint coding on PUCCH format 2 or PUCCH format 3 or PUCCH format 4 is only applicable if the number of bits of any HARQ-ACK codebook is greater than 2 (e.g., under the condition of $O_{ACK\_1}>2$ and $O_{ACK\_0}>2$.

On the other hand, in method 3 above and some cases in method 2, multiplexing of HARQ-ACK of different priorities with joint coding on PUCCH format 2, PUCCH format 3, or PUCCH format 4 may be applied if the total HARQ-ACK payload is more than 2 bits. Furthermore, if the number of bits of any HARQ-ACK codebook is greater than 2, the low priority HARQ-ACK can be appended to the high priority HARQ-ACK. The joint HARQ-ACK is always greater than 2 bits and is reported on a high priority PUCCH resource with PUCCH format 2 or PUCCH format 3 or PUCCH format 4.

Thus, in another approach, if method 2 is used for up to 2 bits of HARQ-ACK codebooks, multiplexing of HARQ-ACK of different priorities with joint coding on PUCCH format 2, PUCCH format 3, or PUCCH format 4 may be applied if the total HARQ-ACK payload of different priorities is more than 2 bits (e.g., under the condition of $O_{ACK\_1}+O_{ACK\_0}>2$).

Yet in another approach, if method 3 is used for up to 2 bits of HARQ-ACK codebooks, 2 bits is always assumed for up to 2 bits of HARQ-ACK, and the total HARQ-ACK payload is always more than 2 bits. In case of 1 bit of HARQ-ACK in a codebook, the HARQ-ACK information bit is repeated to generate two bits (e.g., a bit of "0" is reported with "00", and a bit of "1" is reported with "11"). Thus, HARQ-ACK multiplexing on PUCCH format 2, PUCCH format 3, or PUCCH format 4 may always be used, and may be defined as a unified solution that is applicable to all HARQ-ACK payload sizes. In this case, HARQ-ACK multiplexing with different priorities will not be supported if a UE is configured with only one set of PUCCH resources for the high priority HARQ-ACK.

With HARQ-ACK multiplexing of different priorities and joint coding using PUCCH format 2, PUCCH format 3, or PUCCH format 4, a PUCCH resource configured for the high priority HARQ-ACK should be selected to report the joint HARQ-ACK information.

In one method, if the total payload exceeds the maximum payload size of all configured sets of high priority HARQ-ACK PUCCH resources, the HARQ-ACK codebook with priority 0 should be dropped, and only the HARQ-ACK codebook with priority index 1 is reported on a high priority HARQ-ACK PUCCH resource based on the payload of the high priority HARQ-ACK.

In another method, if the total payload exceeds the maximum payload size of all configured sets of high priority HARQ-ACK PUCCH resources, some payload reduction methods can be applied to the HARQ-ACK codebook with priority 0. The payload reduction method may include some HARQ-ACK bundling schemes. Then, the payload reduced HARQ-ACK with priority 0 can be appended to the HARQ-ACK codebook with priority 1 to create a new joint HARQ-ACK codebook.

The UE may perform PUCCH set selection again based on the payload of the new joint HARQ-ACK information. If there is available high priority HARQ-ACK PUCCH resources to carry the new joint HARQ-ACK information, a high priority HARQ-ACK PUCCH resource may be determined based on the payload of the new joint HARQ-ACK codebook.

If the payload of the new joint HARQ-ACK codebook still exceeds the maximum payload size of all configured sets of high priority HARQ-ACK PUCCH resources, the HARQ-ACK codebook with priority 0 may be dropped, and only the HARQ-ACK codebook with priority index 1 is reported on a high priority HARQ-ACK PUCCH resource based on the payload of the high priority HARQ-ACK.

PUCCH resource selection is also described herein. The PUCCH resource may be selected based on the total UCI payload size, and a single maxCodeRate may be applied for the UCI coding and rate matching on PUCCH using PUCCH format 2, PUCCH format 3, or PUCCH format 4.

For a HARQ-ACK codebook with high priority or a HARQ-ACK codebook with low priority, a UE can be configured up to four sets of PUCCH resources. A set of PUCCH resources is provided by PUCCH-ResourceSet and is associated with a set of PUCCH resources index provided by pucch-ResourceSetId, with a set of PUCCH resource indexes provided by resourceList that provides a set of PUCCH-ResourceId used in the Set of PUCCH resources, and with a maximum number of UCI information bits the UE can transmit using a PUCCH resource in the set of PUCCH resources provided by maxPayloadSize. For the first set of PUCCH resources, the maximum number of UCI information bits is 2. A maximum number of PUCCH resource indexes for a set of PUCCH resources is provided by maxNrofPUCCH-ResourcesPerSet. The maximum number of PUCCH resources in the first set of PUCCH resources is 32 and the maximum number of PUCCH resources in the other set of PUCCH resources is 8.

If the UE transmits $O_{UCI}$ UCI information bits, that include HARQ-ACK information bits, the UE may determine a set of PUCCH resources to be a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously.

Alternatively, the UE may determine a set of PUCCH resources to be a second set of PUCCH resources with pucch-ResourceSetId=1, if provided by higher layers, if $2<O_{UCI} \leq N_2$ where $N_2$ is equal to maxPayloadSize if maxPayloadSize is provided for the set of PUCCH resources with pucch-ResourceSetId=1, otherwise $N_2$ is equal to 1706.

In another alternative, the UE may determine a set of PUCCH resources to be a third set of PUCCH resources with pucch-ResourceSetId=2, if provided by higher layers, if $N_2<O_{UCI} \leq N_3$ where $N_3$ is equal to maxPayloadSize if maxPayloadSize is provided for the Set of PUCCH resources with pucch-ResourceSetId=2; otherwise $N_3$ is equal to 1706, or In another alternative, the UE may determine a set of PUCCH resources to be a fourth set of PUCCH resources with pucch-ResourceSetId=3, if provided by higher layers, if $N_3<O_{UCI} \leq 1706$.

The sets of PUCCH resources for the high priority HARQ-ACK and low priority HARQ-ACK may be configured separately with different PUCCH parameters and PUCCH configurations. In NR release-15 and 16, the HARQ-ACK of a given priority is reported only on a HARQ-ACK PUCCH resource with the same priority. UCI multiplexing of the same priority can be performed and transmitted on a PUCCH with the same priority (e.g., HARQ-ACK and/or SR and/or CSI with the same priority can be multiplexed and reported on a PUCCH resource with the same priority). HARQ-ACK and SR can be configured with priority index 1 (high priority) or priority index 0 (low priority), but CSI is always treated as low priority in Rel-16.

To maintain the reliability requirements of high priority HARQ-ACK, in the case that HARQ-ACK multiplexing of different priorities is supported on PUCCH, a PUCCH resource configured for the high priority HARQ-ACK should be selected to report the multiplexed HARQ-ACK information.

For multiplexing of HARQ-ACK with different priorities with joint coding, and in that case that the total payload is more than 2 bits, for a HARQ-ACK only reporting on a PUCCH using PUCCH format 2, PUCCH format 3, or PUCCH format 4, the payload size is determined by $O_{ACK}=O_{ACK\_1}+O_{ACK\_0}$, as the number of bits for HARQ-ACK for transmission on the current PUCCH, where $O_{ACK}>2$, $O_{ACK\_1}$ is a total number of HARQ-ACK information bits with priority index 1, $O_{ACK\_0}$ is a total number of HARQ-ACK information bits with priority index 0.

The HARQ-ACK multiplexing may happen when the PUCCH for low priority HARQ-ACK and the PUCCH for high priority HARQ-ACK overlaps with each other in a slot. For HARQ-ACK only reporting with joint coding, the joint HARQ-ACK codebook is constructed by appending the HARQ-ACK information bits with priority index 0 to the end of the HARQ-ACK information bits with priority index 1.

The UE determines a set of PUCCH resources based on the $O_{UCI}$ UCI information bits as described above. For HARQ-ACK with different priorities and joint coding, $O_{UCI}$ is given by $O_{ACK}=O_{ACK\_1}+O_{ACK\_0}$.

For a PUCCH transmission with HARQ-ACK information, a UE determines a PUCCH resource after determining a set of PUCCH resources for $O_{UCI}$ HARQ-ACK information bits. The PUCCH resource determination is based on a PUCCH resource indicator field, if present, in a last DCI format, among the DCI formats that have a value of a PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided CORESETPoolIndex or is provided CORESETPoolIndex with value 0 for one or more first CORESETs and is provided CORESETPoolIndex with value 1 for one or more second CORESETs on an active DL BWP of a serving cell, and with ACKNACKFeedbackMode=Joint-Feedback for the active UL BWP, detected DCI formats from PDCCH receptions in the first CORESETs are indexed prior to detected DCI formats from PDCCH receptions in the second CORESETs.

The PUCCH resource indicator field values map to values of a set of PUCCH resource indexes, as defined in Table-5 for a PUCCH resource indicator field of 3 bits, provided by resourceList for PUCCH resources from a set of PUCCH resources provided by PUCCH-ResourceSet with a maximum of eight PUCCH resources. If the PUCCH resource indicator field includes 1 bit or 2 bits, the values map to the first 2 values or the first four values, respectively, of Table-5.

For the first set of PUCCH resources and when the size $R_{PUCCH}$ of resourceList is larger than eight, when a UE provides HARQ-ACK information in a PUCCH transmission in response to detecting a last DCI format in a PDCCH reception, among DCI formats with a value of the PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, the UE determines a PUCCH resource with index $r_{PUCCH}$, $0 \leq R_{PUCCH} \leq R_{PUCCH}-1$, as $$r_{PUCCH} = \begin{cases} \left\lfloor \dfrac{n_{CCE,p} \cdot \lfloor R_{PUCCH}/8 \rfloor}{N_{CCE,p}} \right\rfloor + \\ \quad \Delta_{PRI} \cdot \left\lceil \dfrac{R_{PUCCH}}{8} \right\rceil \quad \text{if } \Delta_{PRI} < R_{PUCCH} \bmod 8 \\ \left\lfloor \dfrac{n_{CCE,p} \cdot \lfloor R_{PUCCH}/8 \rfloor}{N_{CCE,p}} \right\rfloor + \\ \quad \Delta_{PRI} \cdot \left\lfloor \dfrac{R_{PUCCH}}{8} \right\rfloor + R_{PUCCH} \bmod 8 \quad \text{if } \Delta_{PRI} \geq R_{PUCCH} \bmod 8 \end{cases}$$

where $N_{CCE,p}$ is a number of CCEs in CORESET p of the PDCCH reception for the DCI format, $n_{CCE,p}$ is the index of a first CCE for the PDCCH reception, and $\Delta_{PRI}$ is a value of the PUCCH resource indicator field in the DCI format.

Table-5 illustrates examples for mapping of PUCCH resource indication field values to a PUCCH resource in a PUCCH resource set with maximum 8 PUCCH resources.

TABLE 5

| PUCCH resource indicator | | | |
|---|---|---|---|
| 1 bit | 2 bits | 3 bits | PUCCH resource |
| '0' | '00' | '000' | 1$^{st}$ PUCCH resource provided by pucch-ResourceId obtained from the 1$^{st}$ value of resourceList |
| '1' | '01' | '001' | 2$^{nd}$ PUCCH resource provided by pucch-ResourceId obtained from the 2$^{nd}$ value of resourceList |
|  | '10' | '010' | 3$^{rd}$ PUCCH resource provided by pucch-ResourceId obtained from the 3$^{rd}$ value of resourceList |
|  | '11' | '011' | 4$^{th}$ PUCCH resource provided by pucch-ResourceId obtained from the 4$^{th}$ value of resourceList |
|  |  | '100' | 5$^{th}$ PUCCH resource provided by pucch-ResourceId obtained from the 5$^{th}$ value of resourceList |
|  |  | '101' | 6$^{th}$ PUCCH resource provided by pucch-ResourceId obtained from the 6$^{th}$ value of resourceList |
|  |  | '110' | 7$^{th}$ PUCCH resource provided by pucch-ResourceId obtained from the 7$^{th}$ value of resourceList |
|  |  | '111' | 8$^{th}$ PUCCH resource provided by pucch-ResourceId obtained from the 8$^{th}$ value of resourceList |

If a UE detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_c$ from the beginning of a first symbol of the first resource for PUCCH transmission in the slot where, $\kappa$ and $T_c$ are defined in clause 4.1 of 3GPP TS 38.211 and μ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for μ=0, $N_3=4.5$ for μ=1, $N_3=9$ for μ=2; otherwise, $N_3=8$ for μ=0, $N_3=10$ for μ=1, $N_3=17$ for μ=2, and $N_3=20$ for μ=3.

If a UE is not provided SPS-PUCCH-AN-List and transmits HARQ-ACK information corresponding only to a PDSCH reception without a corresponding PDCCH, a PUCCH resource for corresponding PUCCH transmission with HARQ-ACK information is provided by n1PUCCH-AN.

It should be noted that the PUCCH resource determination is performed independently for HARQ-ACK with a given priority index. For a PUCCH transmission with joint HARQ-ACK information with different priorities, a UE determines a high priority PUCCH resource after determining a set of high priority PUCCH resources for $O_{UCI}$ joint HARQ-ACK information bits. The PUCCH resource determination is based on the above procedures for the high priority PDSCH transmissions. For example, the PUCCH resource determination may be based on a PUCCH resource indicator field in a last DCI format scheduling a high priority PDSCH transmission, among the DCI formats that have a value of a PDSCH-to-HARQ feedback timing indicator field, indicating a same slot for the PUCCH transmission.

Code rate and PRB determination for HARQ-ACK multiplexing on PUCCH is now described. A UE is configured by maxCodeRate a code rate for multiplexing HARQ-ACK, SR, and CSI report(s) in a PUCCH transmission using PUCCH format 2, PUCCH format 3, or PUCCH format 4. Currently, maxCodeRate is applicable only for different UCI types with the same priorities can be multiplexed on PUCCH using PUCCH format 2, PUCCH format 3, or PUCCH format 4.

Thus, in the PUCCH-Config for priority index 1, a UE is configured by max-CodeRate a code rate for multiplexing HARQ-ACK, and SR in a PUCCH transmission using PUCCH format 2, PUCCH format 3, or PUCCH format 4. And, in the PUCCH-Config for priority index 0, a UE is configured by a separate maxCodeRate a code rate for multiplexing HARQ-ACK, SR, and CSI report(s) in a PUCCH transmission using PUCCH format 2, PUCCH format 3, or PUCCH format 4.

As an enhancement for UCI reporting, the same UCI type with different priorities can be supported, especially for HARQ-ACK. For multiplexing of HARQ-ACK with different priorities and joint coding on PUCCH format 2, PUCCH format 3, or PUCCH format 4, the maxCodeRate configured for the high priority PUCCH in the corresponding PUCCH-Config should be applied.

In the case of HARQ-ACK multiplexing with different priorities with joint coding, the maxCodeRate configured for the high priority PUCCH-Config is also applied to the joint high priority HARQ-ACK and low priority HARQ-ACK bits in a PUCCH transmission using PUCCH format 2, PUCCH format 3, or PUCCH format 4.

In the following, r is a code rate given by maxCodeRate as in Table-5 configured for the selected PUCCH resource. $M_{RB}^{PUCCH}$ is a number of PRBs for PUCCH format 2, or PUCCH format 3, or PUCCH format 4, respectively, where $M_{RB}^{PUCCH}$ is provided by nrofPRBs in PUCCH-format2 for PUCCH format 2 or by nrofPRBs in PUCCH-format3 for PUCCH format 3, and $M_{RB}^{PUCCH}=1$ for PUCCH format 4.

$N_{sc,ctrl}^{RB}=N_{SC}^{RB}-4$ for PUCCH format 2 or, if the PUCCH resource with PUCCH format 2 includes an orthogonal cover code with length $N_{SF}^{PUCCH,2}$ provided by OCC-Length-r16, $N_{sc,ctrl}^{RB}=(N_{sc}^{RB}-4)/N_{SF}^{PUCCH,2}$, $N_{sc,ctrl}^{RB}=N_{sc}^{RB}$ for PUCCH format 3 or, if the PUCCH resource with PUCCH format 3 includes an orthogonal cover code with length $N_{SF}^{PUCCH,3}$ provided by OCC-Length-r16, $N_{sc,ctrl}^{RB}=N_{sc}^{RB}/N_{SF}^{PUCCH,3}$, and $N_{sc,ctrl}^{RB}=N_{sc}^{RB}/N_{SF}^{PUCCH,4}$ for PUCCH format 4, where $N_{sc}^{RB}$ is a number of subcarriers per resource block.

$N_{symb-UCI}^{PUCCH}$ is equal to a number of PUCCH symbols $N_{symb}^{PUCCH,2}$ for PUCCH format 2 provided by nrofSymbols in PUCCH-format2. For PUCCH format 3 or for PUCCH format 4, $N_{symb-UCI}^{PUCCH}$ is equal to a number of PUCCH symbols $N_{symb}^{PUCCH,3}$ for PUCCH format 3 or equal to a number of PUCCH symbols $N_{symb}^{PUCCH,4}$ for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively.

$Q_m=1$ if pi/2-BPSK is the modulation scheme and $Q_m=2$ if QPSK is the modulation scheme as indicated by pi2BPSK for PUCCH format 3 or PUCCH format 4. For PUCCH format 2, $Q_m=2$.

For a HARQ-ACK only PUCCH reporting on PUCCH format 2/3/4, the payload size is determined by $O^{ACK}$, as the number of bits for HARQ-ACK for transmission on the current PUCCH, where $O_{ACK}>2$ In the case of HARQ-ACK multiplexing with different priorities on PUCCH with joint coding, the payload size is determined by $O_{ACK}=O_{ACK\_1}+O_{ACK\_0}$ as given above.

In some examples, $O_{ACK}$ is a total number of HARQ-ACK information bits, where $O_{ACK}=O_{ACK\_1}+O_{ACK\_0}$. $O_{CRC}$ is a number of CRC bits, if any, for encoding the number of $O_{ACK}$ HARQ-ACK bits. If $O_{ACK}\leq=11$ bits, $O_{UCI}=O_{ACK}$. If $O_{ACK}>11$ bits, $O_{UCI}=O_{ACK}+O_{CRC}$, where $O_{CRC}$ is the number of CRC bits based on $O_{ACK}$.

If a UE transmits a PUCCH with $O_{ACK}$ HARQ-ACK information bits and $O_{CRC}$ bits using PUCCH format 2 or PUCCH format 3 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is less than or equal to a number of PRBs $M_{RB}^{PUCCH}$ provided respectively by nrofPRBs of PUCCH-format2 or nrofPRBs of PUCCH-format3 and start from the first PRB from the number of PRBs, that results to $(O_{ACK}+O_{CRC})\leq M_{RB,min}^{PUCCH}\cdot N_{sc,ctrl}^{RB}\cdot N_{symb-UCI}^{PUCCH}\cdot Q_m\cdot r$ and, if $M_{RB}^{PUCCH}>1$, $(O_{ACK}+O_{CRC})\leq(M_{RB,min}^{PUCCH}-1)\cdot N_{sc,ctrl}^{RB}\cdot N_{symb-UCI}^{PUCCH}\cdot Q_m\cdot r$, where $N_{sc,ctrl}^{RB}$, $N_{symb-UCI}^{PUCCH}$, $Q_m$, and r are defined above. For PUCCH format 3, if $M_{RB,min}^{PUCCH}$ is not equal to $2^{\alpha_2}\cdot 3^{\alpha_3}\cdot 5^{\alpha_5}$ according to TS 38.211, $M_{RB,min}^{PUCCH}$ is increased to the nearest allowed value of nrofPRBs for PUCCH-format3. If $(O_{ACK}+O_{CRC})>(M_{RB}^{PUCCH}-1)\cdot N_{sc,ctrl}^{RB}\cdot N_{symb-UCI}^{PUCCH}\cdot Q_m\cdot r$, the UE transmits the PUCCH over $M_{RB}^{PUCCH}$ PRBs.

If a UE is provided a first interlace of $M_{Interlace,0}^{PUCCH}$ PRBs by interlace0 in InterlaceAllocation-r16 and transmits a PUCCH with $O_{ACK}$ HARQ-ACK information bits and $O_{CRC}$ bits using PUCCH format 2 or PUCCH format 3, the UE transmits the PUCCH over the first interlace if $(O_{ACK}+O_{CRC})\leq M_{Interlace,0}^{PUCCH}\cdot N_{sc,ctrl}^{RB}\cdot N_{symb-UCI}^{PUCCH}\cdot Q_m\cdot r$; otherwise if the UE is provided a second interlace by interlace1 in PUCCH-format2 or PUCCH-format3, the UE transmits the PUCCH over the first and second interlaces.

It should be noted that for a single HARQ-ACK priority reporting, if the number of PRBs calculated based on the maxCodeRate is more than the configured number of PRBs, the configured maximum number of PRBs is used for the PUCCH transmission. For example, if $(O_{ACK}+O_{CRC})>(M_{RB}^{PUCCH}-1)\cdot N_{sc,ctlr}^{RB}\cdot N_{symb-UCI}^{PUCCH}\cdot Q_m\cdot r$, the UE transmits the PUCCH over $M_{RB}^{PUCCH}$ PRBs.

For HARQ-ACK multiplexing with different priorities, the same method can be applied. Thus, after a PUCCH resource is determined based on the total payload of the HARQ-ACK codebooks with different priorities, the UE determines the number of PRBs to multiplex the coded output of the joint HARQ-ACK codebook. If the UE determines the number of PRBs to multiplex the joint HARQ-ACK codebook based on the maxCodeRate is more than the configured maximum number of PRBs.

In one approach, the configured maximum number of PRBs is used for the PUCCH transmission. For example, if $(O_{ACK}+O_{CRC})>(M_{RB}^{PUCCH}-1)\cdot N_{sc,ctlr}^{RB}\cdot N_{symb-UCI}^{PUCCH}\cdot Q_m\cdot r$, the UE transmits the PUCCH over $M_{RB}^{PUCCH}$ PRBs. In this case, the actual maximum code rate for the UCI may be higher than the configured maxCodeRate.

In another approach, the UE may choose to drop the low priority HARQ-ACK to guarantee the performance of high priority HARQ-ACK. Thus, the HARQ-ACK codebook with priority index 0 is not reported. The HARQ-ACK codebook with priority index 1 is reported on a high priority HARQ-ACK PUCCH resource re-selected based on the payload of the high priority HARQ-ACK.

In yet another approach, the UE may perform some bundling methods to reduce the payload size of the low priority HARQ-ACK. The payload reduced HARQ-ACK with priority 0 can be appended to the HARQ-ACK codebook with priority 1 to create a new joint HARQ-ACK codebook. Then the UE should perform PUCCH set selection and UCI multiplexing again based on the payload of the new joint HARQ-ACK information and the maxCodeRate of the PUCCH resource.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
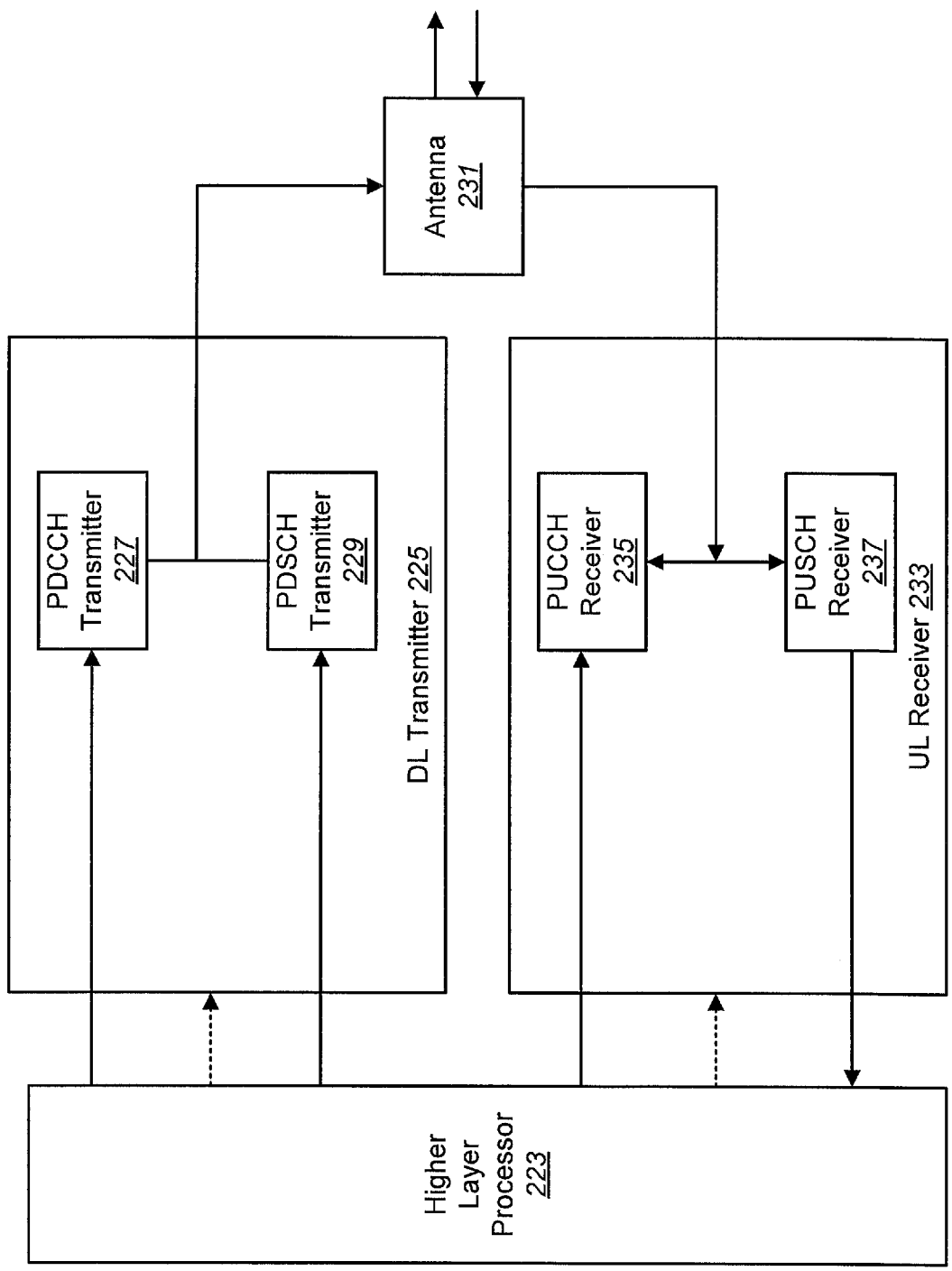
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
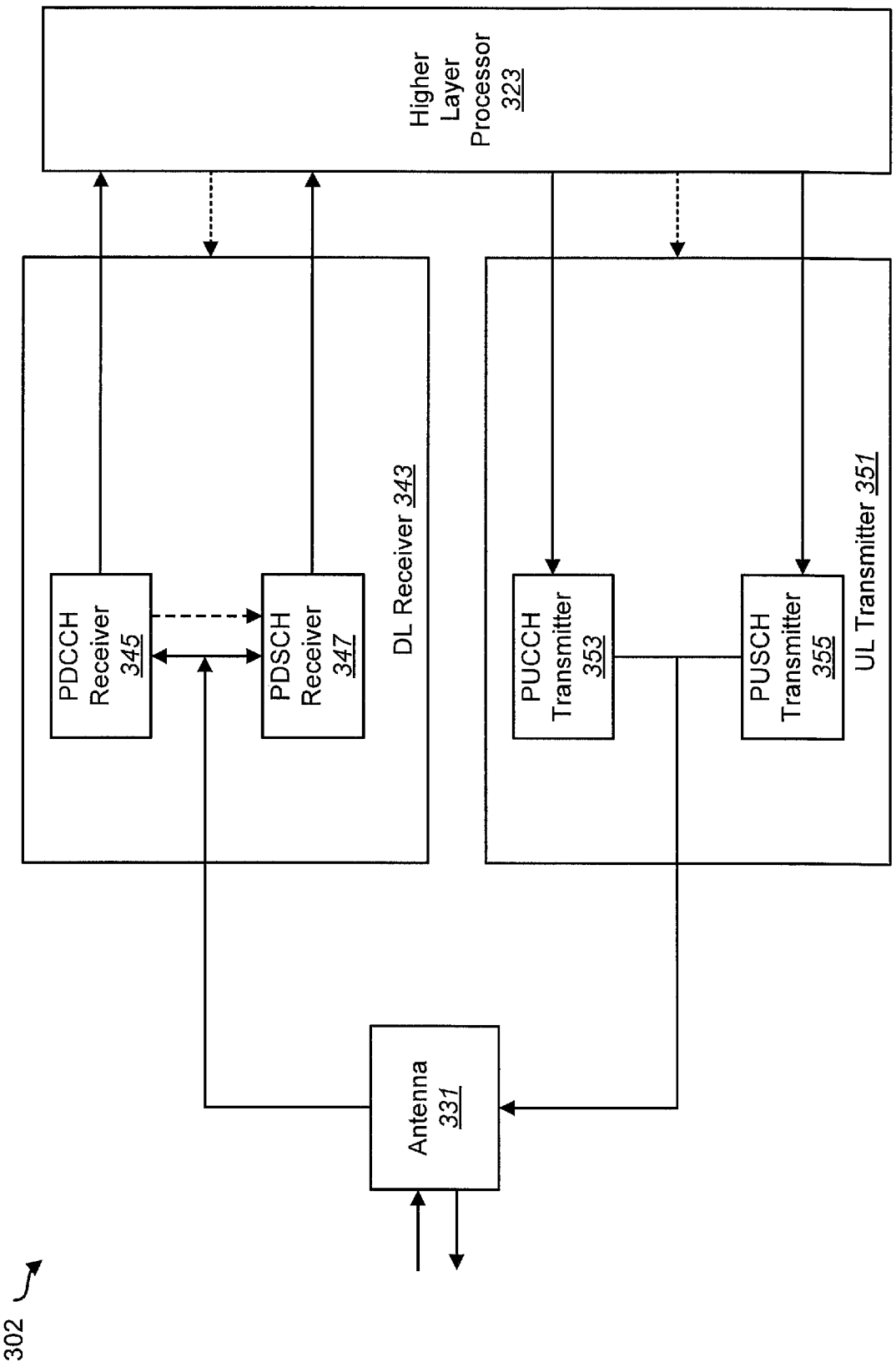
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
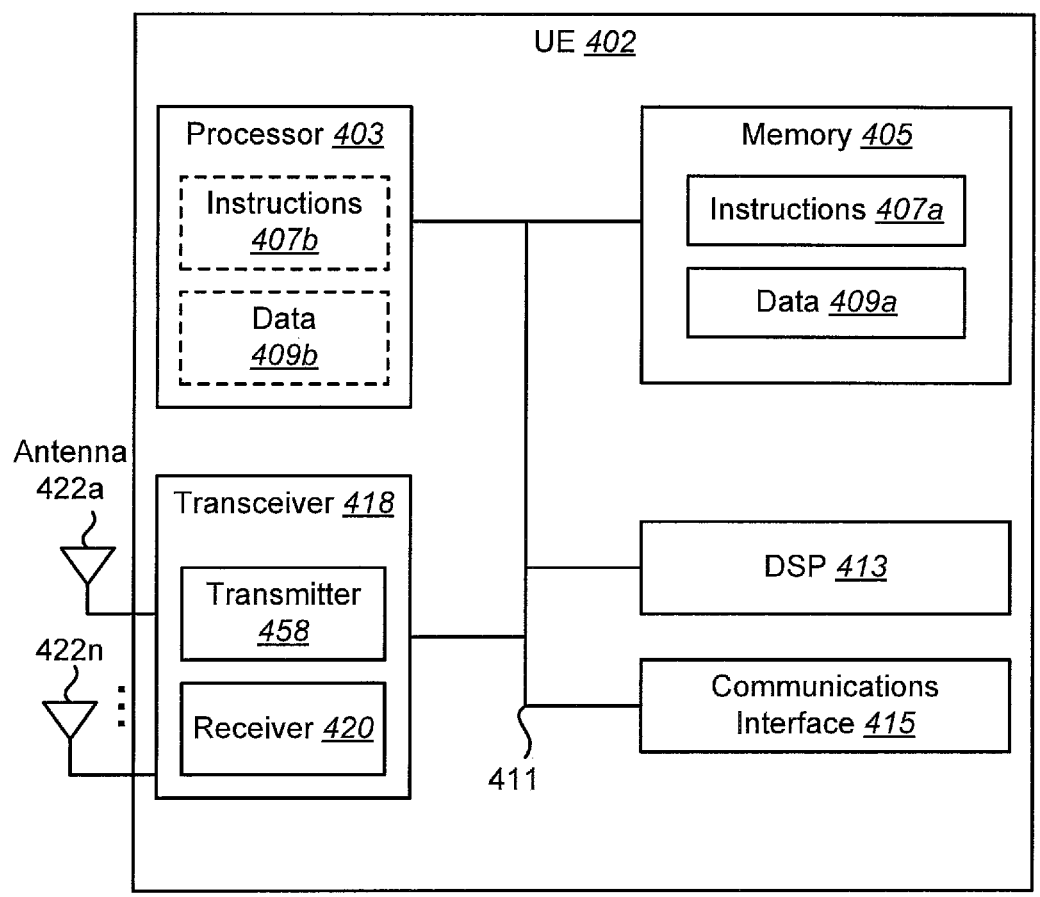
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422*a-n* are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
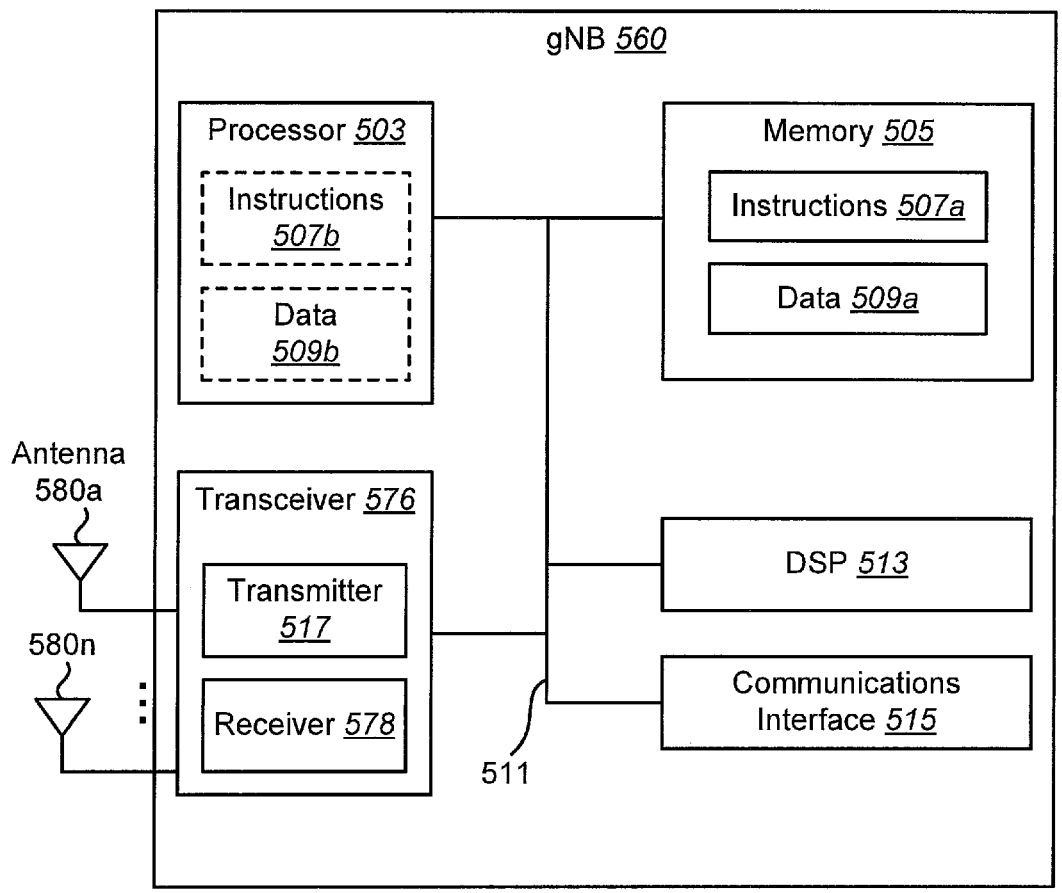
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
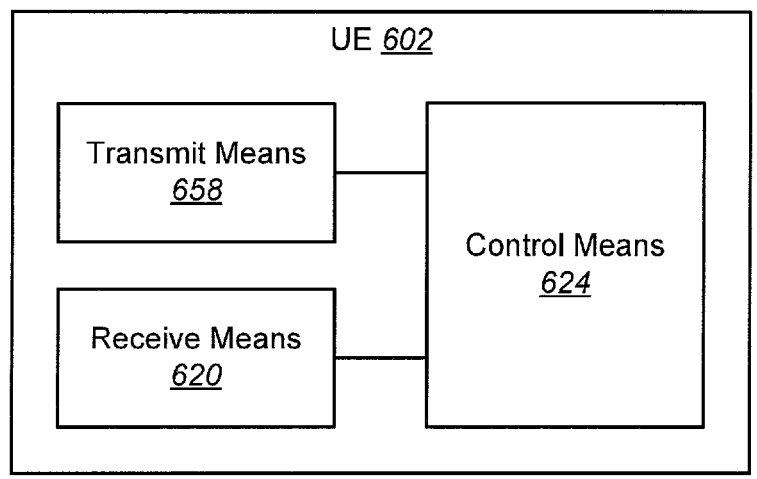
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
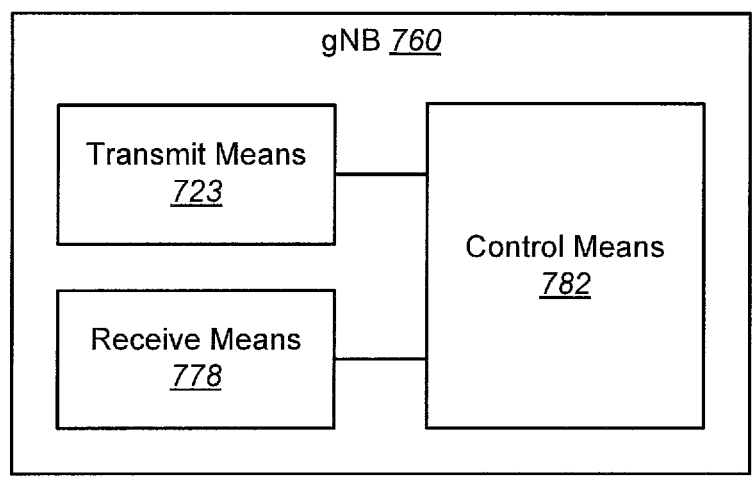
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

Figure 8:
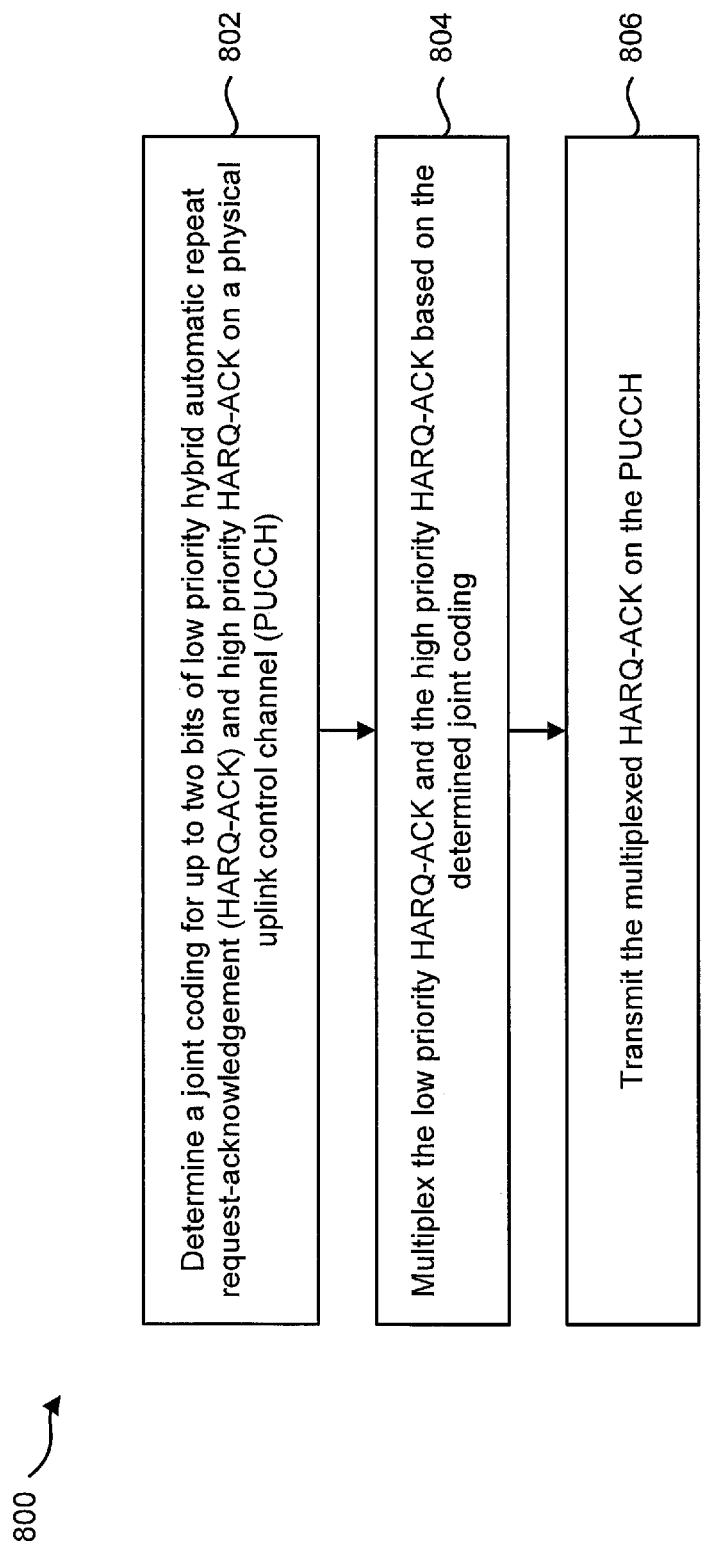
FIG. 8 is a flow diagram illustrating a method by a UE for code rate determination for multiplexing of HARQ-ACK with different priorities on PUCCH for up to 2 bits HARQ-ACK codebooks.

FIG. 8 is a flow diagram illustrating a method 800 by a UE 102 for multiplexing of HARQ-ACK with different priorities on PUCCH for up to 2 bits HARQ-ACK codebooks. The UE 102 may determine 802 a joint coding for up to two bits of low priority hybrid automatic repeat request-acknowledgement (HARQ-ACK) and high priority HARQ-ACK on a physical uplink control channel (PUCCH). The UE 102 may multiplex 804 the low priority HARQ-ACK and the high priority HARQ-ACK based on the determined joint coding. The UE 102 may transmit 806 the multiplexed HARQ-ACK on the PUCCH.

In Method 1, the UE 102 may use the same PUCCH resource with format 0 or format 1 for the high priority HARQ-ACK. PUCCH format 0/1 are sequence based formats that support up to 2 bits of UCI.

In a first approach (Approach 1), HARQ-ACK multiplexing may be performed with bundling within the same priority to a total of 2 bits. The multiplexed HARQ-ACK may be reported on the high priority HARQ-ACK PUCCH resource with PUCCH format 0 or PUCCH format 1 with combinations as follows.

The multiplexed HARQ-ACK may include 1 bit of high priority HARQ-ACK and 1 bit of low priority HARQ-ACK. High priority HARQ-ACK and low priority HARQ-ACK may be concatenated to 2 bits.

The multiplexed HARQ-ACK may include 1 bit of high priority HARQ-ACK and 2 bits of low priority HARQ-ACK. The 2 bits of low priority HARQ-ACK may be bundled into 1 bit. The bundled low priority bit may be appended after the high priority HARQ-ACK.

The multiplexed HARQ-ACK may include 2 bits of high priority HARQ-ACK and 1 bit of low priority HARQ-ACK. The 2 bits of high priority HARQ-ACK may be bundled into 1 bit, then concatenated by appending the low priority HARQ-ACK to the bundled high priority HARQ-ACK bit.

The multiplexed HARQ-ACK may include 2 bit of high priority HARQ-ACK and 2 bit of low priority HARQ-ACK. The 2 bits of high priority HARQ-ACK may be bundled into 1 bit. The 2 bits of low priority HARQ-ACK may also be bundled into 1 bit. The bundled high priority HARQ-ACK and bundled low priority HARQ-ACK may be concatenated to 2 bits.

In a second approach (Approach 2), HARQ-ACK multiplexing may include bundling between different priorities to a total of 2 bits, and reporting on the high priority HARQ-ACK PUCCH resource with PUCCH format 0 or PUCCH format 1 with combinations as follows.

The multiplexed HARQ-ACK may include 1 bit of high priority HARQ-ACK and 1 bit of low priority HARQ-ACK. High priority HARQ-ACK and low priority HARQ-ACK may be concatenated to 2 bits.

The multiplexed HARQ-ACK may include 1 bit of high priority HARQ-ACK and 2 bits of low priority HARQ-ACK. The 1 bit high priority HARQ-ACK may be bundled into the first bit of low priority HARQ-ACK, or the 1 bit high priority HARQ-ACK may be bundled into the second bit of low priority HARQ-ACK.

The multiplexed HARQ-ACK may include 2 bits of high priority HARQ-ACK and 1 bit of low priority HARQ-ACK. The 1 bit low priority HARQ-ACK may be bundled into the first bit of high priority HARQ-ACK, or the 1 bit low priority HARQ-ACK may be bundled into the second bit of high priority HARQ-ACK.

The multiplexed HARQ-ACK may include 2 bits of high priority HARQ-ACK and 2 bits of low priority HARQ-ACK. The first bit high priority HARQ-ACK and the first bit low priority HARQ-ACK may be bundled into 1 bit. The second bit of high priority HARQ-ACK and the second bit low priority HARQ-ACK may be bundled into 1 bit, then the bundled bits may be concatenated.

In a third approach (Approach 3), HARQ-ACK bundling is allowed between different priorities with high priority NACK overwriting. For multiplexing of 1 bit or 2 bits of high priority HARQ-ACK and 1 bit of low priority HARQ-ACK, Approach 1 may be used as described above.

For multiplexing of 1 bit or 2 bits of high priority HARQ-ACK and 2 bits of low priority HARQ-ACK, if the high priority HARQ-ACK is all ACKs, i.e. "1" for 1 bit and "11" for 2 bits of HARQ-ACK, the 2 bits of low priority HARQ-ACK may be reported on the high priority PUCCH resource. If the high priority HARQ-ACK has at least a NACK, i.e. "0" for 1 bit or "01", "10" or "11" for 2 bits of HARQ-ACK, the UE should report all NACKs, i.e. "00" on the high priority PUCCH resource. The 2 bits of low priority HARQ-ACK may be overwritten by the high priority NACK.

In a fourth approach (Approach 4), for PUCCH format 0, HARQ-ACK bundling is applied for low priority HARQ-ACK, and cyclic shift values are used to represent low priority HARQ-ACK. The status of the low priority HARQ-ACK may be represented by a cyclic shift on the sequence and cyclic shift determined by the high priority HARQ-ACK information bits. Only 1 bit of low priority HARQ-ACK bit may be reported. In the case of 2 bits of low priority HARQ-ACK, the 2 bits may be bundled into 1 bit.

In a second method (Method 2), the PUCCH resource may be chosen based on total payload. PUCCH format 2/3/4 may be used if the total payload is greater than 2. For a 1 bit high priority HARQ-ACK and 1 bit low priority HARQ-ACK, the high priority HARQ-ACK and low priority HARQ-ACK may be concatenated to 2 bits. The HARQ-ACK may be reported on the original PUCCH for the high priority HARQ-ACK with PUCCH format 0 or PUCCH format 1.

For 1 bit high priority HARQ-ACK and 2 bits low priority HARQ-ACK, two approaches may be implemented. 2 bits of low priority HARQ-ACK may be bundled into 1 bit, then the bundled low priority bit may be appended after the high priority HARQ-ACK. The HARQ-ACK may be reported on the original PUCCH for high priority HARQ-ACK with PUCCH format 0 or PUCCH format 1. In another approach, the high priority HARQ-ACK and low priority HARQ-ACK may be concatenated and reported on a PUCCH resource with PUCCH format 2/3/4 for more than 2 bits.

For 2 bits of high priority HARQ-ACK and 1 bit or 2 bits of low priority HARQ-ACK, the high priority HARQ-ACK and low priority HARQ-ACK may be concatenated and reported on a PUCCH resource with PUCCH format 2/3/4 for more than 2 bits.

In a third method (Method 3), PUCCH format 2/3/4 may be used with more than 2 bits of UCI payload. In this case, 2 bits for a HARQ-ACK codebook with no more than 2 bits may be assumed. In the case of 1 bit of HARQ-ACK, the HARQ-ACK bit may be repeated to generate 2 bits. Then the two bits of high priority HARQ-ACK and 2 bits of low priority HARQ-ACK may be concatenated and reported on a high priority HARQ-ACK PUCCH resource with PUCCH format 2/3/4 for more than 2 bits.

In a fourth method (Method 4), joint HARQ-ACK multiplexing and reporting may be based on PUCCH channel selection. The low priority HARQ-ACK bits may be reported on a HARQ-ACK PUCCH resource. The high priority HARQ-ACK may be represented by the PUCCH resource selection. An ACK may be reported for the high priority HARQ-ACK if the low priority HARQ-ACK is reported on the high priority PUCCH resource. A NACK is reported for the high priority HARQ-ACK if the low priority HARQ-ACK is reported on the low priority PUCCH resource.

For multiplexing of 1 bit or 2 bits of high priority HARQ-ACK and 1 or 2 bits of low priority HARQ-ACK, if the high priority HARQ-ACK is all ACKs, i.e. "1" for 1 bit and "11" for 2 bits of HARQ-ACK, the 2 bits of low priority HARQ-ACK may be reported on the high priority PUCCH resource. If the high priority HARQ-ACK has at least a NACK, i.e. "0" for 1 bit or "01", "10" or "11" for 2 bits of HARQ-ACK, the UE may report all NACKs, i.e. "00" on the high priority PUCCH resource. The 2 bits of low priority HARQ-ACK may be overwritten by the high priority NACK.

For multiplexing of 1 bit of high priority HARQ-ACK and 1 bit or 2 bits of low priority HARQ-ACK, if the high priority HARQ-ACK is all ACKs, i.e. "1" for 1 bit and "11" for 2 bits of HARQ-ACK, the 1 bit or 2 bits of low priority HARQ-ACK may be reported on the high priority PUCCH resource. If the high priority HARQ-ACK has at least a NACK, i.e. "0" for 1 bit or "01", "10" or "11" for 2 bits of HARQ-ACK, the 1 bit or 2 bits of low priority HARQ-ACK may be reported on the low priority PUCCH resource. In this case, high priority PUCCH is not transmitted.

Figure 9:
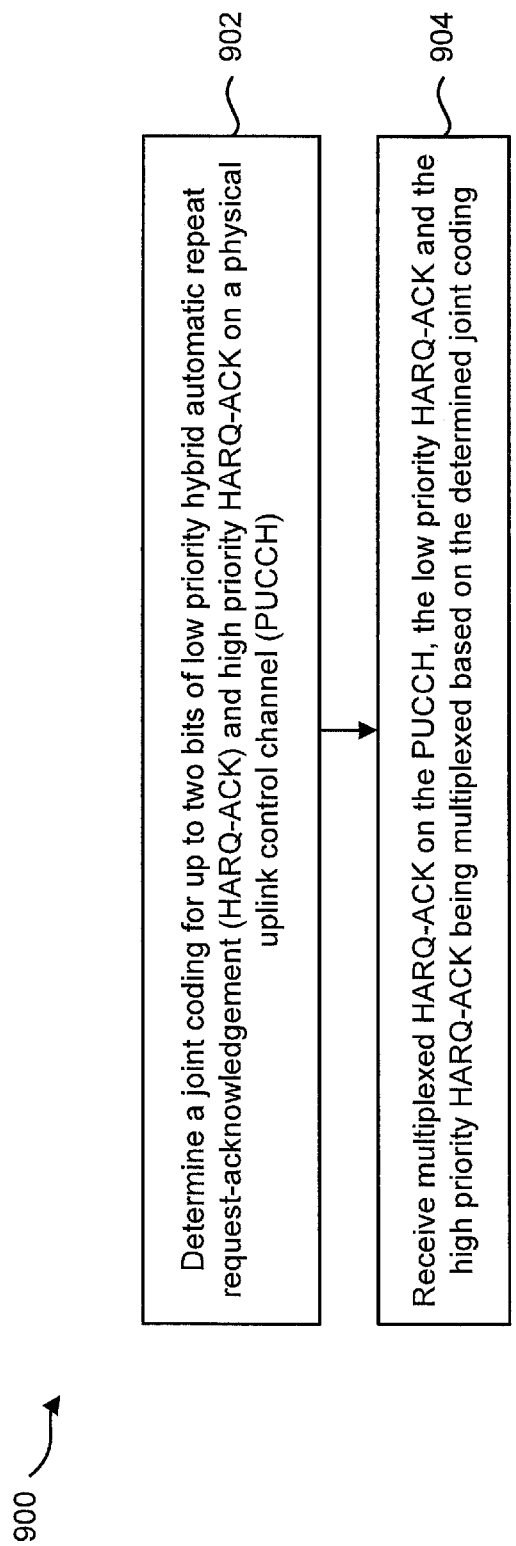
FIG. 9 is a flow diagram illustrating a method by a gNB for code rate determination for multiplexing of HARQ-ACK with different priorities on PUCCH for up to 2 bits HARQ-ACK codebooks.

FIG. 9 is a flow diagram illustrating a method 900 by a gNB 160 for multiplexing of HARQ-ACK with different priorities on PUCCH for up to 2 bits HARQ-ACK codebooks. The gNB 160 may determine 902 a joint coding for up to two bits of a low priority hybrid automatic repeat request-acknowledgement (HARQ-ACK) that is multiplexed with a high priority HARQ-ACK on a physical uplink control channel (PUCCH). The gNB 160 may receive 904 multiplexed HARQ-ACK on the PUCCH. The low priority HARQ-ACK and the high priority HARQ-ACK may be multiplexed based on the determined joint coding.

Figure 10:
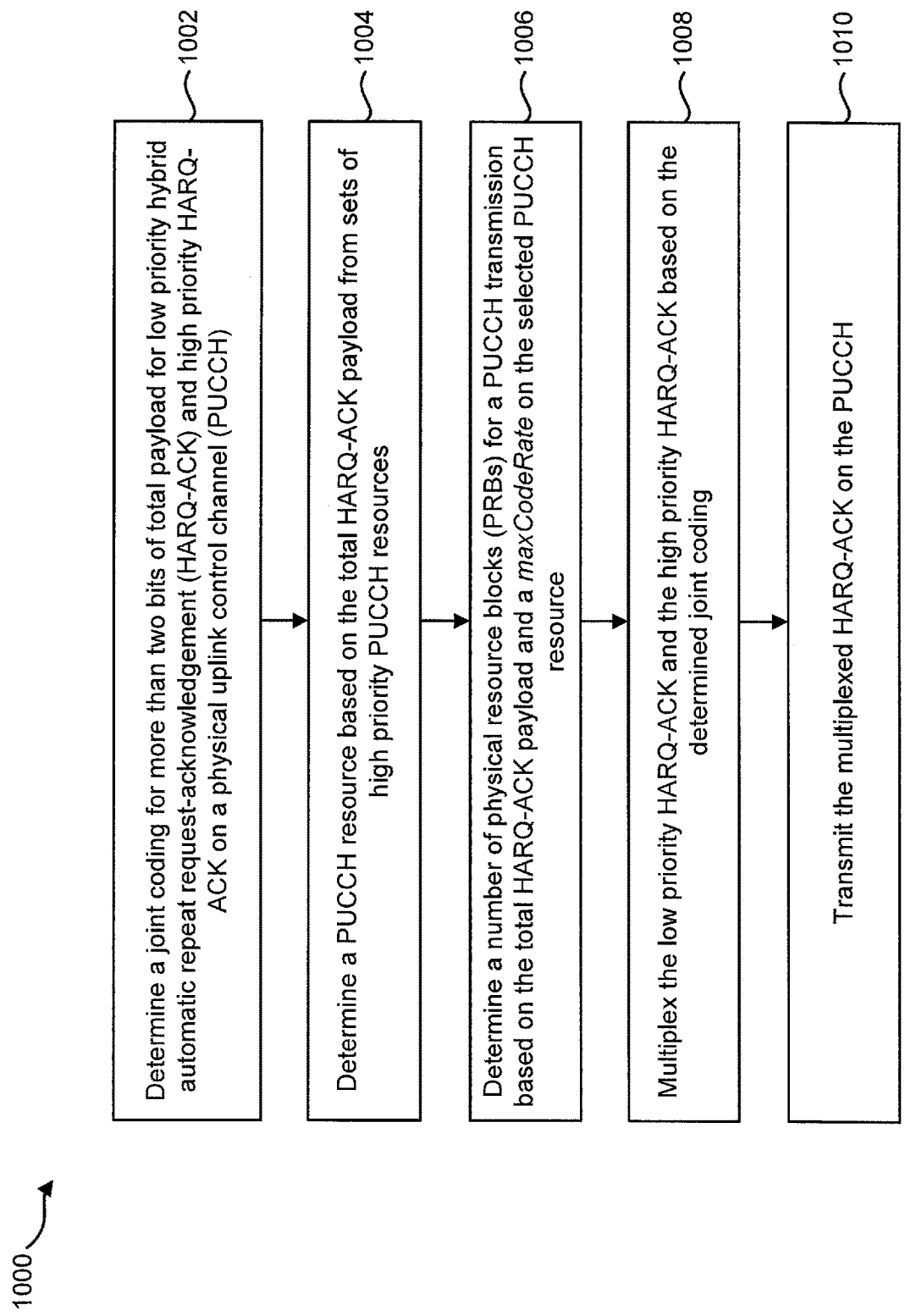
FIG. 10 is a flow diagram illustrating a method by a UE for joint coding and multiplexing of HARQ-ACK with different priorities on PUCCH format 2, PUCCH format 3 or PUCCH format 4.

FIG. 10 is a flow diagram illustrating a method 1000 by a UE 102 for joint coding and multiplexing of HARQ-ACK with different priorities on PUCCH format 2, PUCCH format 3 or PUCCH format 4. The UE 102 may determine 1002 a joint coding for more than two bits of total payload for low priority hybrid automatic repeat request-acknowledgement (HARQ-ACK) and high priority HARQ-ACK on a physical uplink control channel (PUCCH). The UE 102 may determine 1004 a PUCCH resource based on the total HARQ-ACK payload from sets of high priority PUCCH resources. The UE 102 may determine 1006 a number of physical resource blocks (PRBs) for a PUCCH transmission based on the total HARQ-ACK payload and a max-CodeRate on the selected PUCCH resource. The UE 102 may multiplex 1008 the low priority HARQ-ACK and the high priority HARQ-ACK based on the determined joint coding. The UE 102 may transmit 1010 the multiplexed HARQ-ACK on the PUCCH.

In a first approach (Approach 1), if method 1 and method 4 above are used for up to 2 bits of HARQ-ACK codebooks, multiplexing of HARQ-ACK of different priorities with joint coding on PUCCH format 2, PUCCH format 3, or PUCCH format 4 may be performed if the number of bits of any HARQ-ACK codebook is greater than 2 (e.g., $O_{ACK\_1} > 2$ and $O_{ACK\_0} > 2$).

In a second approach (Approach 2), if method 2 is used for up to 2 bits of HARQ-ACK codebooks, multiplexing of HARQ-ACK of different priorities with joint coding on PUCCH format 2, PUCCH format 3, or PUCCH format 4 may be performed if the total HARQ-ACK payload of different priorities is more than 2 bits (e.g., $O_{ACK\_1} + O_{ACK\_0} > 2$).

In a third approach (Approach 3), if method 3 is used for up to 2 bits of HARQ-ACK codebooks, 2 bits may be assumed for up to 2 bits of HARQ-ACK. Thus, HARQ-ACK multiplexing on PUCCH format 2, PUCCH format 3, or PUCCH format 4 may be applied to all HARQ-ACK payload cases. HARQ-ACK multiplexing with different priorities may not be supported if a UE is configured with only one set of PUCCH resources for the high priority HARQ-ACK.

For PUCCH resource determination and multiplexing of HARQ-ACK with different priorities on PUCCH format 2/3/4 and joint coding, a set of PUCCH resources may be determined from the high priority sets of PUCCH resources based on the total payload of high priority HARQ-ACK and low priority HARQ-ACK. If the total payload exceeds maximum payload sizes of all configured high priority PUCCH resources, then in one method, the low priority HARQ-ACK is dropped. In another method, the payload of low priority HARQ-ACK may be reduced by some bundling methods, and a new joint HARQ-ACK codebook may be generated by concatenating the high priority HARQ-ACK with the low priority HARQ-ACK with reduced payload. The PUCCH resource may be re-selected based on the payload of the new joint HARQ-ACK codebook.

The PUCCH resource may be determined based on the DCI indication from the high priority PDSCH transmissions.

The maxCodeRate configured for the high priority PUCCH in the corresponding PUCCH-Config may be used. Currently, maxCodeRate is only applicable to UCI multiplexing of different UCI types, HARQ-ACK, SR and CSI. However, maxCodeRate is not defined for the same UCI type but different priorities.

The number of PRBs for PUCCH transmission of the joint HARQ-ACK with different priorities may be determined based on the total payload size and the max-CodeRate configured for the high priority PUCCH resource. If the UE determines that the number of PRBs to multiplex the joint HARQ-ACK codebook based on the max-CodeRate is more than the configured maximum number of PRBs, then in one approach, the UE may transmit the PUCCH using the configured maximum number of PRBs. In another approach, the UE may choose to drop the low priority HARQ-ACK, and the HARQ-ACK codebook with priority index 1 is reported on a high priority HARQ-ACK PUCCH resource re-selected based on the payload of the high priority HARQ-ACK. In yet another approach, the payload of the low priority HARQ-ACK may be reduced by some bundling methods, and a new joint HARQ-ACK codebook is generated by concatenating the high priority HARQ-ACK with the low priority HARQ-ACK with reduced payload. The PUCCH resource may be re-selected based on the payload of the new joint HARQ-ACK codebook, and multiplexing is performed on the new selected PUCCH resource based on the payload and maxCodeRate.

Figure 11:
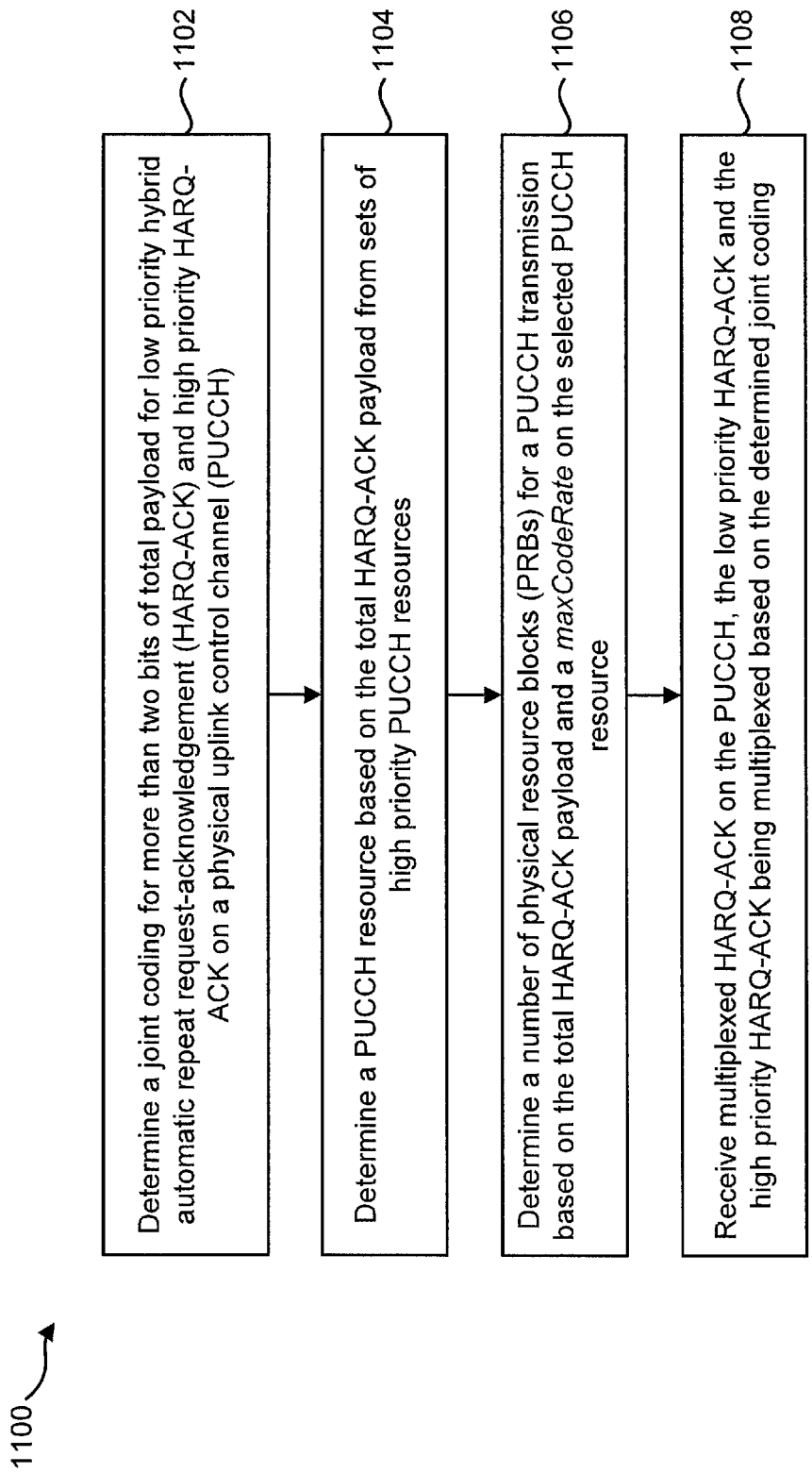
FIG. 11 is a flow diagram illustrating a method by a gNB for joint coding and multiplexing of HARQ-ACK with different priorities on PUCCH format 2, PUCCH format 3 or PUCCH format 4.

FIG. 11 is a flow diagram illustrating a method 1100 by a gNB 160 for joint coding and multiplexing of HARQ-ACK with different priorities on PUCCH format 2, PUCCH format 3 or PUCCH format 4. The gNB 160 may determine

1102 a joint coding for more than two bits of total payload for low priority hybrid automatic repeat request-acknowledgement (HARQ-ACK) and high priority HARQ-ACK on a physical uplink control channel (PUCCH). The gNB 160 may determine 1104 a PUCCH resource based on the total HARQ-ACK payload from sets of high priority PUCCH resources. The gNB 160 may determine 1106 a number of physical resource blocks (PRBs) for a PUCCH transmission based on the total HARQ-ACK payload and a max-CodeRate on the selected PUCCH resource. The gNB 160 may receive 1108 multiplexed HARQ-ACK on the PUCCH. The low priority HARQ-ACK and the high priority HARQ-ACK may be multiplexed based on the determined joint coding.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like) and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a micro-controller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

SUMMARY

In one example, a user equipment (UE), comprising: a processor configured to: determine a joint coding for more than two bits of total payload for low priority hybrid automatic repeat request-acknowledgement (HARQ-ACK) and high priority HARQ-ACK on a physical uplink control channel (PUCCH); determine a PUCCH resource based on the total HARQ-ACK payload from sets of high priority PUCCH resources; determine a number of physical resource blocks (PRBs) for a PUCCH transmission based on the total HARQ-ACK payload and a maxCodeRate on the selected PUCCH resource; and multiplex the low priority HARQ-ACK and the high priority HARQ-ACK based on the determined joint coding; and transmitting circuitry configured to transmit the multiplexed HARQ-ACK on the PUCCH.

In one example, the UE, wherein the high priority HARQ-ACK and low priority HARQ-ACK are concatenated into a single joint HARQ-ACK codebook for the PUCCH transmission.

In one example, the UE, wherein if the total HARQ-ACK payload exceeds a maximum payload size of all configured sets of high priority HARQ-ACK PUCCH resources, the processor is to: transmit the high priority HARQ-ACK on a high priority PUCCH based on a payload of the high priority HARQ-ACK; and drop a low priority HARQ-ACK codebook.

In one example, the UE, wherein if the total HARQ-ACK payload exceeds a maximum payload size of all configured sets of high priority HARQ-ACK PUCCH resources, the processor is to: perform payload reduction to a low priority HARQ-ACK codebook; and create a new joint HARQ-ACK codebook by appending the payload reduced low priority HARQ-ACK to a high priority HARQ-ACK codebook.

In one example, a base station (gNB), comprising: a processor configured to: determine a joint coding for more than two bits of total payload for low priority hybrid automatic repeat request-acknowledgement (HARQ-ACK) and high priority HARQ-ACK on a physical uplink control channel (PUCCH); determine a PUCCH resource based on the total HARQ-ACK payload from sets of high priority PUCCH resources; and determine a number of physical resource blocks (PRBs) for a PUCCH transmission based on the total HARQ-ACK payload and a maxCodeRate on the selected PUCCH resource; and receiving circuitry configured to receive multiplexed HARQ-ACK on the PUCCH, the low priority HARQ-ACK and the high priority HARQ-ACK being multiplexed based on the determined joint coding.

In one example, the gNB, wherein the high priority HARQ-ACK and low priority HARQ-ACK are concatenated into a single joint HARQ-ACK codebook for the PUCCH transmission.

In one example, the gNB, wherein if the total HARQ-ACK payload exceeds a maximum payload size of all configured sets of high priority HARQ-ACK PUCCH resources, the processor is to: receive the high priority HARQ-ACK on a high priority PUCCH based on a payload of the high priority HARQ-ACK; and drop a low priority HARQ-ACK codebook.

In one example, the gNB, wherein if the total HARQ-ACK payload exceeds a maximum payload size of all configured sets of high priority HARQ-ACK PUCCH resources, the processor is to: perform payload reduction to a low priority HARQ-ACK codebook; and create a new joint HARQ-ACK codebook by appending the payload reduced low priority HARQ-ACK to a high priority HARQ-ACK codebook.

In one example, a method by a user equipment (UE), comprising: determining a joint coding for more than two bits of total payload for low priority hybrid automatic repeat request-acknowledgement (HARQ-ACK) and high priority HARQ-ACK on a physical uplink control channel (PUCCH); determining a PUCCH resource based on the total HARQ-ACK payload from sets of high priority PUCCH resources; determining a number of physical resource blocks (PRBs) for a PUCCH transmission based on the total HARQ-ACK payload and a maxCodeRate on the selected PUCCH resource; multiplexing the low priority HARQ-ACK and the high priority HARQ-ACK based on the determined joint coding; and transmitting the multiplexed HARQ-ACK on the PUCCH.

In one example, the method, wherein the high priority HARQ-ACK and low priority HARQ-ACK are concatenated into a single joint HARQ-ACK codebook for the PUCCH transmission.

In one example, the method, wherein if the total HARQ-ACK payload exceeds a maximum payload size of all configured sets of high priority HARQ-ACK PUCCH resources, the method comprises: transmitting the high priority HARQ-ACK on a high priority PUCCH based on a payload of the high priority HARQ-ACK; and dropping a low priority HARQ-ACK codebook.

In one example, the method, wherein if the total HARQ-ACK payload exceeds a maximum payload size of all configured sets of high priority HARQ-ACK PUCCH resources, the method comprises: performing payload reduction to a low priority HARQ-ACK codebook; and creating a new joint HARQ-ACK codebook by appending the payload reduced low priority HARQ-ACK to a high priority HARQ-ACK codebook.

In one example, a method by a base station (gNB), comprising: determining a joint coding for more than two bits of total payload for low priority hybrid automatic repeat request-acknowledgement (HARQ-ACK) and high priority HARQ-ACK on a physical uplink control channel (PUCCH); determining a PUCCH resource based on the total HARQ-ACK payload from sets of high priority PUCCH resources; and determining a number of physical resource blocks (PRBs) for a PUCCH transmission based on the total HARQ-ACK payload and a maxCodeRate on the selected PUCCH resource; and receiving multiplexed HARQ-ACK on the PUCCH, the low priority HARQ-ACK and the high priority HARQ-ACK being multiplexed based on the determined joint coding.

In one example, the method, wherein the high priority HARQ-ACK and low priority HARQ-ACK are concatenated into a single joint HARQ-ACK codebook for the PUCCH transmission.

In one example, the method, wherein if the total HARQ-ACK payload exceeds a maximum payload size of all configured sets of high priority HARQ-ACK PUCCH resources, the method comprises: receiving the high priority HARQ-ACK on a high priority PUCCH based on a payload of the high priority HARQ-ACK; and dropping a low priority HARQ-ACK codebook.

In one example, the method, wherein if the total HARQ-ACK payload exceeds a maximum payload size of all configured sets of high priority HARQ-ACK PUCCH resources, the method comprises: performing payload reduction to a low priority HARQ-ACK codebook; and creating a new joint HARQ-ACK codebook by appending the payload reduced low priority HARQ-ACK to a high priority HARQ-ACK codebook.

In one example, a user equipment (UE), comprising: a processor configured to: determine that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determine a PUCCH resource from the sets of PUCCH resources configured for priority index 1 based on the total HARQ-ACK payload of the first HARQ-ACK with priority index 1 and the second HARQ-ACK with priority index 0; and multiplex the HARQ-ACK with priority index 1 and the HARQ-ACK with priority index 0 on the selected PUCCH resource with priority index 1; and transmitting circuitry configured to transmit the multiplexed HARQ-ACK on the selected PUCCH with priority index 1.

In one example, the UE, wherein if the total HARQ-ACK payload exceeds a maximum payload size of all configured sets of HARQ-ACK PUCCH resources for priority index 1, the processor is to: transmit the HARQ-ACK with priority index 1 on a PUCCH resource configured with priority index 1 based on a payload of the HARQ-ACK with priority index 1; and drop the HARQ-ACK codebook with priority index 0.

In one example, the UE, wherein if the total HARQ-ACK payload exceeds a maximum payload size of all configured sets of HARQ-ACK PUCCH resources for priority index 1, the processor is to: perform payload reduction to the HARQ-ACK codebook with priority index 0; and determine a PUCCH resource from the sets of PUCCH resources configured for priority index 1 based on the total HARQ-ACK payload of the first HARQ-ACK with priority index 1 and the payload reduced HARQ-ACK with priority index 0; and multiplex the HARQ-ACK with priority index 1 and the payload reduced HARQ-ACK with priority index 0 on the selected PUCCH resource with priority index 1; and transmit the multiplexed HARQ-ACK on the selected PUCCH with priority index 1.

In one example, a base station (gNB), comprising: a processor configured to: determine that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determine a PUCCH resource from the sets of PUCCH resources configured for priority index 1 based on the total HARQ-ACK payload of the first HARQ-ACK with priority index 1 and the second HARQ-ACK with priority index 0; and receiving circuitry configured to receive the multiplexed HARQ-ACK with priority index 1 and HARQ-ACK with priority index 0 on the selected PUCCH resource with priority index 1.

In one example, the gNB, wherein if the total HARQ-ACK payload exceeds a maximum payload size of all configured sets of HARQ-ACK PUCCH resources for priority index 1, the processor is to: receive the HARQ-ACK with priority index 1 on a PUCCH resource configured with priority index 1 based on a payload of the HARQ-ACK with priority index 1; and drop the HARQ-ACK codebook with priority index 0.

In one example, the gNB, wherein if the total HARQ-ACK payload exceeds a maximum payload size of all configured sets of HARQ-ACK PUCCH resources for priority index 1, the processor is to: perform payload reduction to the HARQ-ACK codebook with priority index 0; and determine a PUCCH resource from the sets of PUCCH resources configured for priority index 1 based on the total HARQ-ACK payload of the first HARQ-ACK with priority index 1 and the payload reduced HARQ-ACK with priority index 0; and receive the multiplexed HARQ-ACK with priority index 1 and the payload reduced HARQ-ACK with priority index 0 on the selected PUCCH resource with priority index 1.

In one example, method by a user equipment (UE), comprising: determining that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determining a PUCCH resource from the sets of PUCCH resources configured for priority index 1 based on the total HARQ-ACK payload of the first HARQ-ACK with priority index 1 and the second HARQ-ACK with priority index 0; and multiplexing the HARQ-ACK with priority index 1 and the HARQ-ACK with priority index 0 on the selected PUCCH resource with priority index 1; and transmitting the multiplexed HARQ-ACK on the selected PUCCH with priority index 1.

In one example, the method, wherein if the total HARQ-ACK payload exceeds a maximum payload size of all configured sets of HARQ-ACK PUCCH resources for priority index 1, the processor is to: transmitting the HARQ-ACK with priority index 1 on a PUCCH resource configured with priority index 1 based on a payload of the HARQ-ACK with priority index 1; and dropping the HARQ-ACK codebook with priority index 0.

In one example, the method, wherein if the total HARQ-ACK payload exceeds a maximum payload size of all configured sets of HARQ-ACK PUCCH resources for priority index 1, the processor is to: performing payload reduction to the HARQ-ACK codebook with priority index 0; and determining a PUCCH resource from the sets of PUCCH resources configured for priority index 1 based on the total HARQ-ACK payload of the first HARQ-ACK with priority index 1 and the payload reduced HARQ-ACK with priority index 0; and multiplexing the HARQ-ACK with priority index 1 and the payload reduced HARQ-ACK with priority index 0 on the selected PUCCH resource with priority index 1; and transmitting the multiplexed HARQ-ACK on the selected PUCCH with priority index 1.

In one example, a method by a base station (gNB), comprising: a processor configured to: determining that a first PUCCH with priority index 1 carrying a first HARQ-ACK with priority index 1 overlaps with a second PUCCH with priority index 0 carrying a second HARQ-ACK with priority index 0, and the total payload of the first HARQ-ACK and the second HARQ-ACK is more than 2 bits, determining a PUCCH resource from the sets of PUCCH resources configured for priority index 1 based on the total HARQ-ACK payload of the first HARQ-ACK with priority index 1 and the second HARQ-ACK with priority index 0; and receiving the multiplexed HARQ-ACK with priority index 1 and HARQ-ACK with priority index 0 on the selected PUCCH resource with priority index 1.

In one example, the method, wherein if the total HARQ-ACK payload exceeds a maximum payload size of all configured sets of HARQ-ACK PUCCH resources for priority index 1, the processor is to: receiving the HARQ-ACK with priority index 1 on a PUCCH resource configured with priority index 1 based on a payload of the HARQ-ACK with priority index 1; and dropping the HARQ-ACK codebook with priority index 0.

In one example, the method, wherein if the total HARQ-ACK payload exceeds a maximum payload size of all configured sets of HARQ-ACK PUCCH resources for priority index 1, the processor is to: performing payload reduction to the HARQ-ACK codebook with priority index 0; and determining a PUCCH resource from the sets of PUCCH resources configured for priority index 1 based on the total HARQ-ACK payload of the first HARQ-ACK with priority index 1 and the payload reduced HARQ-ACK with priority index 0; and receiving the multiplexed HARQ-ACK with priority index 1 and the payload reduced HARQ-ACK with priority index 0 on the selected PUCCH resource with priority index 1.

What is claimed is:

1. A user equipment (UE), comprising:
a processor configured to:
   determine that a first physical uplink control channel (PUCCH) with priority index 1 carrying a first hybrid automatic repeat request-acknowledgement (HARQ-ACK) with priority index 1 overlaps with a second PUCCH with priority index 0 carrying a second HARQ-ACK with priority index 0, and determine a total HARQ-ACK payload of the first HARQ-ACK and the second HARQ-ACK is more than 2 bits,
   determine a PUCCH resource from sets of PUCCH resources configured for priority index 1 based on the total HARQ-ACK payload of the first HARQ-ACK with priority index 1 and the second HARQ-ACK with priority index 0, and
   multiplex the first HARQ-ACK with priority index 1 and the second HARQ-ACK with priority index 0 on the determined PUCCH resource with priority index 1; and
transmitting circuitry configured to transmit the multiplexed HARQ-ACK on the determined PUCCH resource with priority index 1.

2. The UE of claim 1, wherein in a case that the total HARQ-ACK payload exceeds a maximum payload size of all the configured sets of HARQ-ACK PUCCH resources for priority index 1, the transmitting circuitry is further configured to:
   transmit the first HARQ-ACK with priority index 1 on another PUCCH resource with priority index 1 based on a payload of the first HARQ-ACK with priority index 1, and
   drop the second HARQ-ACK with priority index 0.

3. The UE of claim 1, wherein in a case that the total HARQ-ACK payload exceeds a maximum payload size of all the configured sets of HARQ-ACK PUCCH resources for priority index 1, the processor is further configured to:
   perform a payload reduction on the second HARQ-ACK with priority index 0 to generate a payload reduced HARQ-ACK with priority index 0,
   determine another PUCCH resource from the sets of PUCCH resources configured for priority index 1 based on a total HARQ-ACK payload of the first HARQ-ACK with priority index 1 and the payload reduced HARQ-ACK with priority index 0,
   multiplex, as another multiplexed HARQ-ACK, the first HARQ-ACK with priority index 1 and the payload reduced HARQ-ACK with priority index 0 on the determined PUCCH resource with priority index 1; and
the transmitting circuitry is further configured to transmit the other multiplexed HARQ-ACK on the other determined PUCCH with priority index 1.

4. A base station (gNB), comprising:
a processor configured to:
   determine that a first physical uplink control channel (PUCCH) with priority index 1 carrying a first hybrid automatic repeat request-acknowledgement (HARQ-ACK) with priority index 1 overlaps with a second PUCCH with priority index 0 carrying a second HARQ-ACK with priority index 0, and determine a total HARQ-ACK payload of the first HARQ-ACK and the second HARQ-ACK is more than 2 bits, and
   determine a PUCCH resource from sets of PUCCH resources configured for priority index 1 based on the total HARQ-ACK payload of the first HARQ-ACK with priority index 1 and the second HARQ-ACK with priority index 0; and
receiving circuitry configured to receive a multiplexed HARQ-ACK, which is formed by multiplexing the first HARQ-ACK with priority index 1 and the second HARQ-ACK with priority index 0, on the determined PUCCH resource with priority index 1.

5. The gNB of claim 4, wherein in a case that the total HARQ-ACK payload exceeds a maximum payload size of all the configured sets of HARQ-ACK PUCCH resources for priority index 1, the receiving circuitry is further configured to:
   receive the first HARQ-ACK with priority index 1 on another PUCCH resource with priority index 1 based on a payload of the first HARQ-ACK with priority index 1, and
   drop the second HARQ-ACK with priority index 0.

6. The gNB of claim 4, wherein in a case that the total HARQ-ACK payload exceeds a maximum payload size of all the configured sets of HARQ-ACK PUCCH resources for priority index 1, the processor is further configured to:
   perform a payload reduction on the second HARQ-ACK with priority index 0 to generate a payload reduced HARQ-ACK with priority index 0,
   determine another PUCCH resource from the sets of PUCCH resources configured for priority index 1 based on a total HARQ-ACK payload of the first HARQ-ACK with priority index 1 and the payload reduced HARQ-ACK with priority index 0; and
   the receiving circuitry is further configured to receive another multiplexed HARQ-ACK, which is formed by multiplexing the first HARQ-ACK with priority index 1 and the payload reduced HARQ-ACK with priority index 0, on the other determined PUCCH resource with priority index 1.

7. A method performed by a user equipment (UE), the method comprising:
   determining that a first physical uplink control channel (PUCCH) with priority index 1 carrying a first hybrid automatic repeat request-acknowledgement (HARQ-ACK) with priority index 1 overlaps with a second PUCCH with priority index 0 carrying a second HARQ-ACK with priority index 0, and determining a total HARQ-ACK payload of the first HARQ-ACK and the second HARQ-ACK is more than 2 bits;
   determining a PUCCH resource from sets of PUCCH resources configured for priority index 1 based on the total HARQ-ACK payload of the first HARQ-ACK with priority index 1 and the second HARQ-ACK with priority index 0;
   multiplexing the first HARQ-ACK with priority index 1 and the second HARQ-ACK with priority index 0 on the determined PUCCH resource with priority index 1; and
   transmitting the multiplexed HARQ-ACK on the determined PUCCH resource with priority index 1.

* * * * *